(12) United States Patent
Mulchandani et al.

(10) Patent No.: US 10,944,772 B2
(45) Date of Patent: Mar. 9, 2021

(54) CONNECTED SECURITY SYSTEM

(71) Applicant: Accenture Global Solutions Limited, Dublin (IE)

(72) Inventors: Shaan Mulchandani, Arlington, VA (US); Amin Hassanzadeh, Arlington, VA (US); Elvis Hovor, Clarksburg, MD (US); Shimon Modi, Washington, DC (US); Walid Negm, Reston, VA (US)

(73) Assignee: Accenture Global Solutions Limited, Dublin (IE)

( * ) Notice: Subject to any disclaimer, the term of this patent is extended or adjusted under 35 U.S.C. 154(b) by 218 days.

(21) Appl. No.: 16/191,844

(22) Filed: Nov. 15, 2018

(65) Prior Publication Data
US 2019/0089727 A1 Mar. 21, 2019

Related U.S. Application Data

(62) Division of application No. 15/051,528, filed on Feb. 23, 2016, now Pat. No. 10,148,679.
(Continued)

(51) Int. Cl.
*H04L 29/06* (2006.01)
*G06F 21/55* (2013.01)

(52) U.S. Cl.
CPC ........ *H04L 63/1425* (2013.01); *G06F 21/554* (2013.01); *H04L 63/1433* (2013.01); *H04L 63/1441* (2013.01); *H04L 63/0227* (2013.01)

(58) Field of Classification Search
CPC . H04L 43/45; H04L 63/1425; H04L 63/1433; H04L 63/1441; G06F 21/554
(Continued)

(56) References Cited

U.S. PATENT DOCUMENTS

2007/0209074 A1 9/2007 Coffman
2008/0005794 A1 1/2008 Inoue et al.
(Continued)

FOREIGN PATENT DOCUMENTS

AU 2016202184 9/2016

OTHER PUBLICATIONS

European Office Action for Application No. 16203185.0, dated Apr. 11, 2019, 6 pages.
(Continued)

*Primary Examiner* — Jacob Lipman
(74) *Attorney, Agent, or Firm* — Fish & Richardson P.C.

(57) ABSTRACT

Systems, methods, and apparatus, including computer programs encoded on computer storage media, for obtaining, processing, and presenting data related to security events, and for implementing courses of action to protect assets in response to the security events. An event management module identifies malicious activity present on a first network domain and/or a second network domain based on received network domain activity. A threat intelligence module receives data identifying the malicious activity in first data constructs of a predefined data structure. The threat intelligence module obtains additional data related to the identified malicious activity and generates second data constructs that include enriched data regarding the malicious activity. The enriched data includes data describing a campaign in which at least a portion of the malicious activity is involved and one or more courses of action. A course of action module receives the second data constructs and implements a given course of action.

21 Claims, 12 Drawing Sheets

Related U.S. Application Data

(60) Provisional application No. 62/265,186, filed on Dec. 9, 2015.

(58) Field of Classification Search
USPC .......................................................... 726/23
See application file for complete search history.

(56) References Cited

U.S. PATENT DOCUMENTS

| | | |
|---|---|---|
| 2008/0082772 A1 | 4/2008 | Savagaonkar et al. |
| 2011/0252032 A1 | 10/2011 | Fitzgerald et al. |
| 2013/0318603 A1 | 11/2013 | Merza |
| 2015/0033333 A1 | 1/2015 | Merza |
| 2015/0074806 A1 | 3/2015 | Roundy et al. |
| 2015/0172321 A1 | 6/2015 | Kirti et al. |
| 2015/0199513 A1 | 7/2015 | Ismael et al. |
| 2016/0063072 A1* | 3/2016 | N .......................... G06F 16/248 707/722 |

OTHER PUBLICATIONS

European Extended Search Report for Application No. 16203185.0, dated May 12, 2017, 8 pages.
Australian Office Action for Application No. 2016269514, dated Jun. 1, 2017, 6 pages.
Canadian Office Action for Application No. 2,950,987, dated Aug. 29, 2017, 6 pages.
Australian Office Action for Application No. 2016269514, dated Oct. 31, 2017, 5 pages.
European Office Action for Application No. 16203185.0, dated Jun. 13, 2018, 7 pages.
Canadian Office Action for Application No. 2950987, dated Jun. 4, 2018, 4 pages.

* cited by examiner

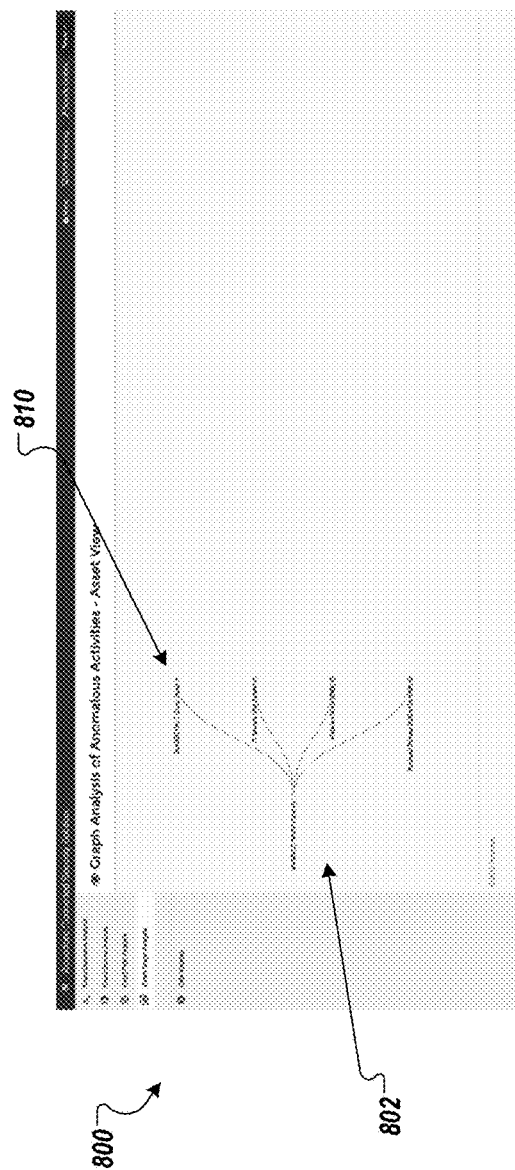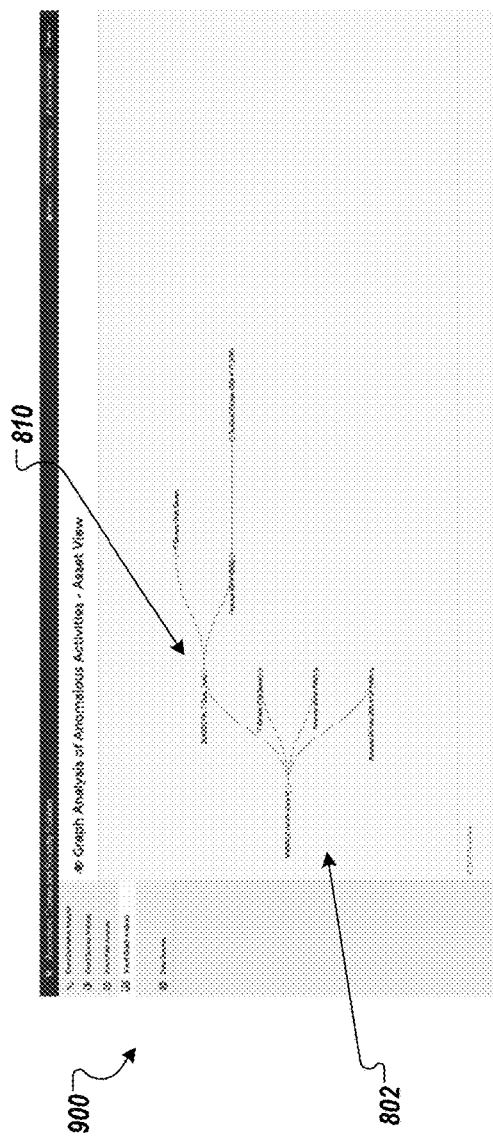
FIG. 8
FIG. 9

CONNECTED SECURITY SYSTEM

CROSS-REFERENCE TO RELATED APPLICATION

This application is a divisional of U.S. application Ser. No. 15/051,528, filed Feb. 23, 2016, now allowed, which claims the benefit of U.S. Provisional Patent Application No. 62/265,186, filed Dec. 9, 2015, both of which are incorporated by reference.

BACKGROUND

The present disclosure relates to security and network operations.

SUMMARY

In general, one innovative aspect of the subject matter described in this specification can be embodied in methods for obtaining, processing, and presenting data related to security events, and for implementing courses of action to protect assets in response to the security events, including receiving, by an event management module and for a network of an organization, network domain activity that includes first domain activity data from a first network domain and second domain activity from a second network domain; identifying, by the event management module, malicious activity present on at least one of the first network domain or the second network domain based on the received network domain activity; receiving, by a threat intelligence module and from the even management module, data identifying the malicious activity in one or more first data constructs of a predefined data structure; obtaining, by the threat intelligence module and from one or more third party sources, additional data related to the identified malicious activity; generating, by the threat intelligence module and using the data identifying the malicious activity and the additional data, one or more second data constructs of the predefined data structure that include enriched data regarding the malicious activity, the enriched data including (i) data describing a campaign in which at least a portion of the malicious activity is involved and (ii) one or more courses of action for mitigating the malicious activity; receiving, by a course of action module, the one or more second data constructs from the threat intelligence module; and implementing, by the course of action module, a given course of action of the one or more course of action.

Other embodiments of this aspect include corresponding computer methods, and include corresponding apparatus and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments may each optionally include one or more of the following features. For instance, the predefined data structure can include a Structured Threat Information Expression STIX data structure. The one or more first data constructs can include at least one of: (i) an incident data construct that includes data describing a particular security event identified from the received network domain activity; an indicator data construct that includes data describing attack patterns identified from the received network domain activity; or (iii) an actor data construct that includes data describing a malicious actor that caused at least a portion of the malicious activity. The one or more second data constructs can include at least one of (i) a campaign data construct that includes data describing a malicious campaign; (ii) a weakness data construct that includes data describing a weakness of the network; or (iii) a course of action data construct that includes data describing at least one of the one or more courses of action.

Another innovative aspect of the subject matter described in this specification can be embodied in methods for obtaining, processing, and presenting data related to security events, and for implementing courses of action to protect assets in response to the security events, including receiving, for an organization, first domain activity data from a first network domain and second domain activity data from a second network domain, the first domain activity data and the second domain activity data including events, alerts, or both from the respective first and second network domains; determining, based on the first domain activity data and the second domain activity data of the first data construct, one or more anomalous correlated event paths through which security events have progressed through at least one of the first network domain or the second network domain, each anomalous correlated event path including one or more assets of the organization; generating one or more first data constructs that include at least one of (i) the first domain activity data, (ii) the second domain activity data, or (iii) data describing the one or more anomalous correlated event paths; receiving external threat data including events, alerts, or both for one or more organizations different from the organization; generating a second data construct that includes data from the one or more first data constructs and at least a portion of the external threat data; determining, based on the one or more anomalous correlated event paths and the threat data, a risk associated with each of one or more outcomes for the organization; generating a visualization of the one or more anomalous correlated event paths and each risk; generating a third data construct that specifies a course of action determined based on at least one of one or more anomalous correlated event paths and each risk; and providing the third data construct to a course of action module that implements the course of action, wherein the first data construct, the second data construct, and the third data construct have a common data structure.

These and other embodiments may each optionally include one or more of the following features. For instance, the first network domain can be an information technology domain and the second network domain is an operational technology domain. The visualization can include a Sankey diagram that illustrates a plurality of paths between particular threats and the one or more outcomes.

The path between each particular threat and the one or more outcomes can include at least one asset and at least one business process of the organization. Each path can include a link between a particular threat and a particular asset. A width of the link can be based on a likelihood of the particular threat affecting the particular asset.

The visualization can present a number of security events for at least one of the first network domain or the second network domain for a particular period of time. The visualization can present a number of security events for each of the one or more assets for a particular period of time. The visualization can present an amount of security events that have taken each of the one or more attack paths.

Particular embodiments of the subject matter described in this specification may be implemented so as to realize one or more of the following advantages. Assets of an industrial control system can be protected in a connected networking environment, such as an operational technology network connected to an enterprise network and/or the Internet. Data regarding malicious activity detected in the connected networking environment can be communicated between several different modules using a predefined data structure to maintain the data in an organized way. Various user interfaces can be generated, e.g., based on data stored using the predefined data structure, to present information related to security events that have been detected, paths within the networking environment that the security events have taken, and the risks associated with assets of the networking environment based on the security events and their paths. Courses of action may be executed (e.g., automated, semi-automated, or manually) to prevent attacks from reaching assets of the networking environment.

The details of one or more implementations of the subject matter described in this specification are set forth in the accompanying drawings and the description below. Other potential features, aspects, and advantages of the subject matter will become apparent from the description, the drawings, and the claims.

DESCRIPTION OF DRAWINGS

FIGS. 2-10 depict example screen shots of user interfaces that are generated in accordance with implementations of the present disclosure.

Like reference symbols in the various drawings indicate like elements.

DETAILED DESCRIPTION

Figure 1A:
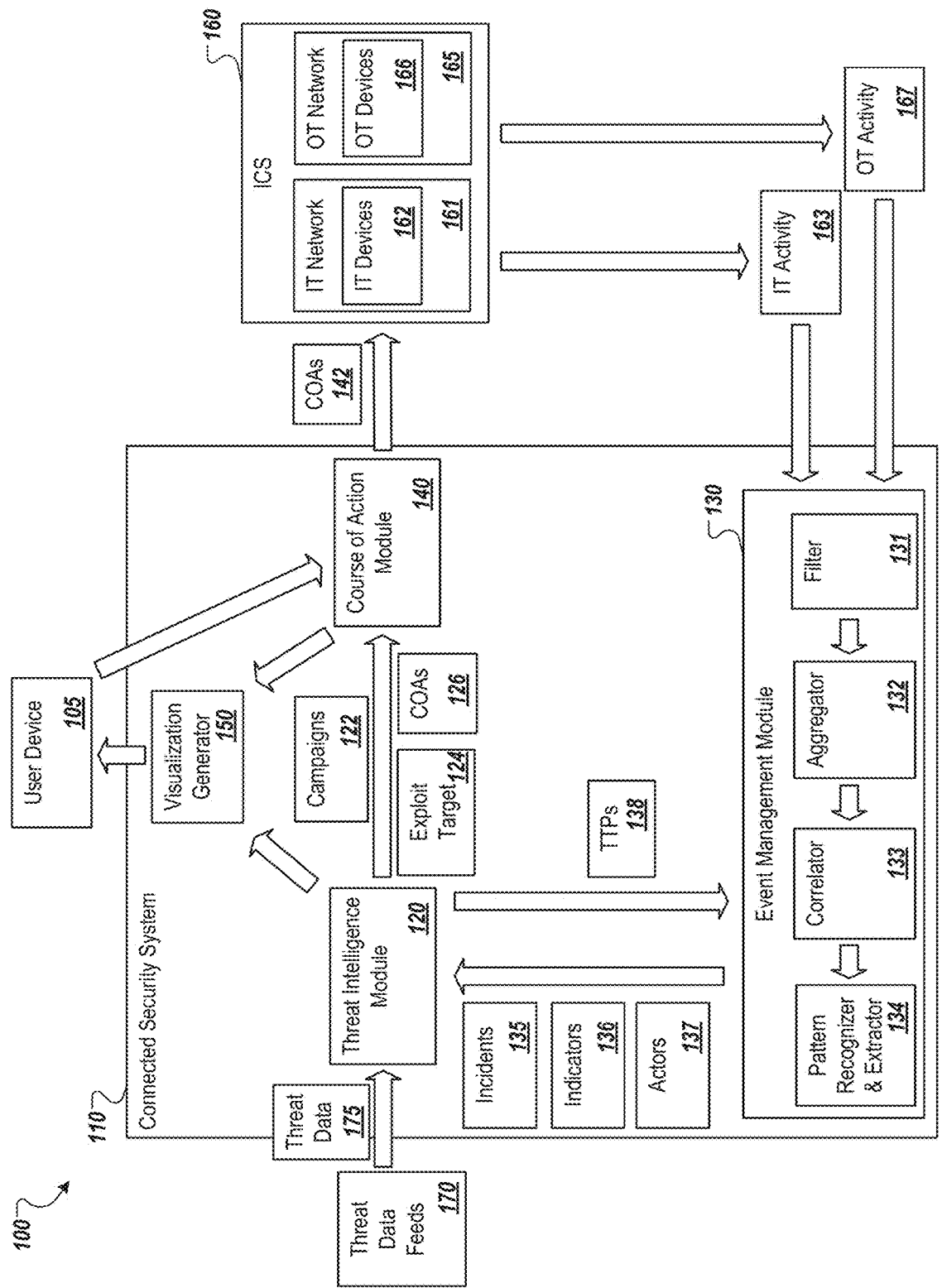
FIGS. 1A and 1B depict an example system that can execute implementations of the present disclosure.

This specification describes systems, methods, and computer programs for obtaining, processing, and presenting data related to security events, and for implementing courses of action to protect assets in response to the security events. For example, an industrial internet may be used to manage and administer industrial control systems (ICS), which may communicate over an enterprise network and may include information technology (IT) and operational technology (OT) network domains. Some threat scenarios may include multi-step, multi-domain attacks, and may include attacks that originate in one domain, and proceed to another domain. A connected security system can include multiple components that process data related to the attacks, provide visualization data related to the attacks, and implement courses of action based on the attacks (e.g. to mitigate the attacks). The underlying components may utilize a common framework, or protocol based on a framework or set of standards, to share information. For example, the underlying components may use a predefined data structure that includes multiple different data constructs to share the information.

The connected security system may include an event management module that filters, aggregates, correlates, and detects patterns in data from event/alert logs from each domain (e.g., IT and OT domains), to detect complex attack patterns. A threat intelligence module of the connected security system may obtain from external threat security feeds additional data related to the detected attack patterns and/or event/alert data received from the domains. The threat intelligence module may also identify threat outcomes that an organization will actually face based on the equipment and operations that are part of the organization's ongoing operations, the additional data, and/or the detected attack patterns. The threat intelligence module may also determine and recommend courses of action based on the identified threat outcomes. A course of action module of the connected security system may implement the courses of action. For example, the course of action implementation may be automated (e.g., implemented by the system in response to detecting a particular attack), semi-automated (e.g., the system recommends courses of action for selection by a security administrator), and/or manual (e.g., implemented by a security administrator).

The connected security system may provide user interfaces that enable security administrators to view data related to security events and risks and adverse outcomes associated with the security events, and to act on those security events. An example user interface shows potential outcomes based on security events (e.g., security events related to one or more different components and/or one or more different domains) and the associated risk of each outcome occurring. Another example user interface allows the system administrators to select courses of action to take in response to the security events. The courses of action can be manual or recommended by the connected security system.

FIG. 1 depicts an example environment 100 in which a connected security system 110 that can execute implementations of the present disclosure. In the present example, the connected security system 100 includes a threat intelligence module 120, an event management module 130, and a course of action module 140. Each of the modules 120, 130, and 140 may be implemented in hardware and/or software. Although the modules 120, 130, and 140 are depicted as separate modules, the functionality of the modules 120, 130, and 140 may be implemented in a single module or in two or more modules. For example, the modules 120, 130, and 140 may be implemented in one or more servers. The server(s), for example, can include one or more processors configured to execute instructions stored by computer-readable media for performing various operations, such as input/output, communication, data processing and/or maintenance.

Figure 1B:
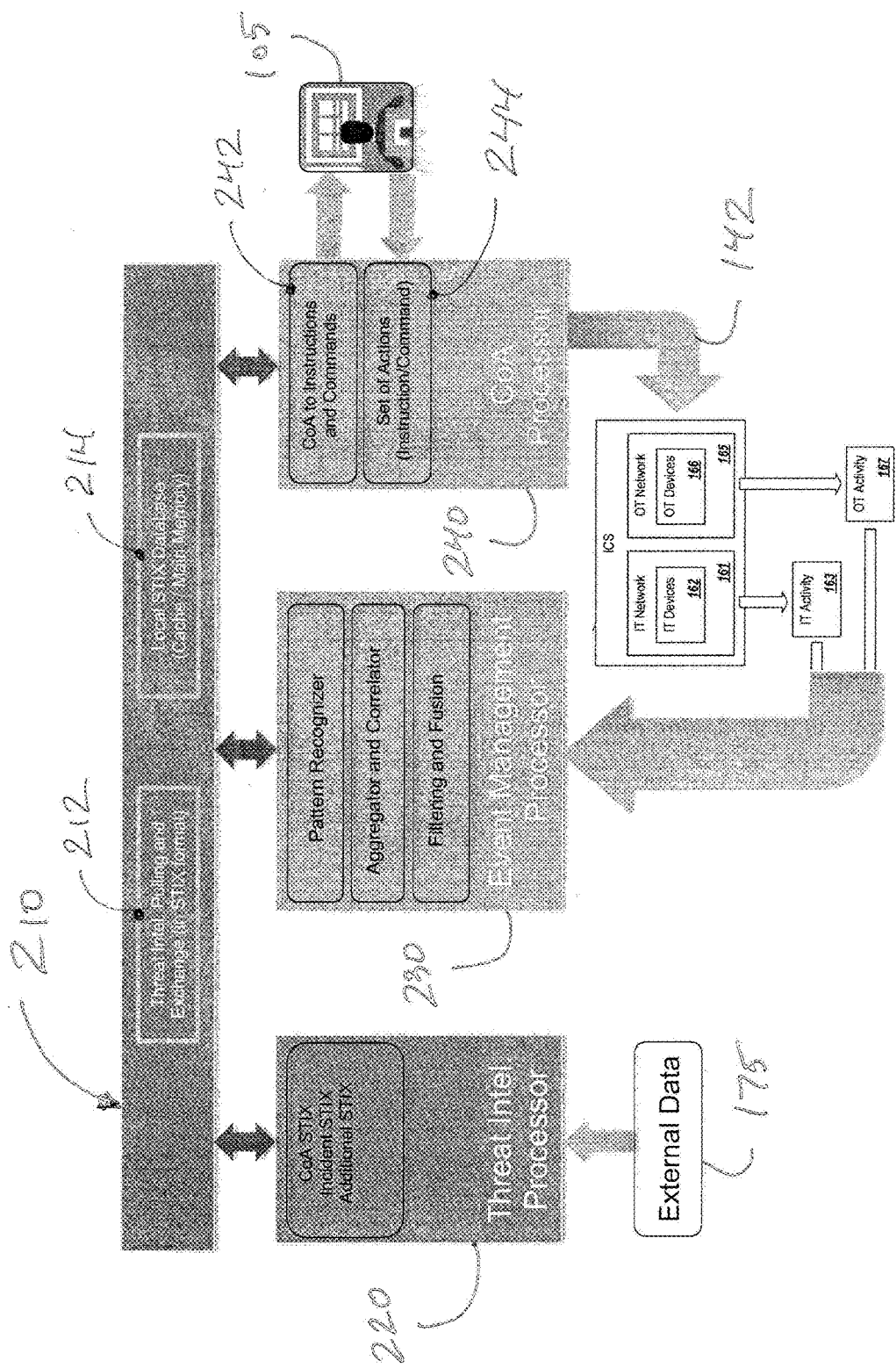

With reference to FIG. 1B, the connected security system 110 also includes a connection processor 210, implemented as a special purpose processor, that is configured to centrally coordinate the various processing functions within the system 110. The connection processor 210 includes a threat intelligence processing engine 212 that is configured to perform the actual communication of messages between the various processors that interface with the connection processor 210. The connection processor 210 also includes a local STIX database 214 that is maintained within a memory cache that is part of the primary memory storage forming part of the connection processor 210.

The connection processor 210 is a middle layer processor that is interconnected with a threat intelligence processor 220, an event management processor 230, and a course of action processor 240. The threat intelligence processor 220 is a special purpose processor within the threat intelligence module 120. The event management processor 230 is a special purpose processor within the event management module 130. The course of action processor 240 is a special purpose processor within the course of action module 140. The connection processor 210 is responsible for coordinating the overall supervisory processing and control within the connected security system 110, and also controls the communication, distribution, and routing of messages and standardized data constructs (e.g. STIX messages) between the various processors 220, 230, 240 in communication with the connection processor 210.

In one example, the event management processor 230 provides indicator and tactics, techniques, and procedures (TTPs) STIX messages that contain information about recent anomalous activity to the connection processor 210.

The connection processor 210 compares STIX messages received from the event management processor 230 with other messages and data received from the threat intelligence module 120 and its associated threat intelligence processor 220. If necessary, the connection processor 210 attaches course of action, incident, and additional STIX messages (provided by the threat intelligence processor 220) to the previously received STIX structured messages from the event management processor 230.

The connection processor 210 then provides the most effective predetermined course of action STIX message to the course of action processor 240.

The course of action processor 240 is operable to convert all of the STIX messages that it receives into instructions and commands 142 as output to other devices in the industrial control system (ICS) 160. The course of action processor 240 is also configured to request user input in response to an unspecified command or commands. The course of action processor 240 is then updated with new commands and/or instructions that can be understood by IT devices 162 and OT devices 166 within the ICS 160.

The advantages of the distributed processing architecture associated with the connection processor 210 include that each processor 220, 230, 240 in the connected security system 110 is specialized and can be customized to its particular security related task to enhance overall system performance. This in turn allows each processor to operate faster and more effectively because each processor is only required to execute functions related to its particular task. Each of the processors 220, 230, 240 is designed to be platform agnostic and can be configured to work either independently as a standalone processor for particular security applications, or configured to be interconnected with other special purpose processors as part of a larger comprehensive security analysis system as shown in FIGS. 1A and 1B. The connection processor 210 and each of the processors 220, 230, 240 can be configured to provide a modular security system for organizations that are able to take advantage of new or other individual security solutions with the only requirement that they communicate with the connection processor 210 using the data constructs (in many cases standardized) that are used within the modules of the connected security system 110 (e.g. modules 120, 130, 140). As described for the exemplary implementation of the connected security system 100, the connection processor 210 and the processors 220, 230, 240 each are capable of receiving and outputting standard-format data constructs based on STIX structured messages.

In a first example processing operation, the event management module 130 and the event management processor 230 processes all events (alerts and logs) received as IT activity data 163 and/or OT activity data 167, and extracts a complex attack pattern out of this data 163, 167. The event management processor 230 may then determine that the extracted attack pattern is a new and complex attack pattern, and the details that uniquely identify this new attack pattern are added to a repository within the event management module 130.

Since the pattern does not exist in the pattern recognizer database within the pattern recognizer forming part of the event management processor 230, the event management processor 230 adds the new pattern to its pattern recognizer database and generates indicators and TTP STIX data messages that explain and define the new attack pattern using a data construct that can be further processed by the connection processor 210. As a next processing step, the connection processor 210 then performs an analysis against its local STIX database 214 to determine whether it contains any data constructs that are similar to the data constructs provided by the event management processor 230.

If nothing exits, the following processing steps are initiated. The connection processor 210 sends a request to the threat intelligence processor 220 to perform a search for related indicator and/or TTP STIX messages. The threat intelligence processor 220 executes the search request and returns (to the connection processor 210) all other information related to the indicator and/or TTP STIX messages it has received from the connection processor 210. If additional information is returned to the connection processor 210, that information is stored in the local STIX database 214. The connection processor 210 then extracts the corresponding course of action STIX messages, formats a data construct containing this information and forwards the data construct to the course of action processor 240 for automatic implementation. The course of action processor 240 receives the data construct from the connection processor 210 and converts the information contained in the STIX messages to instructions and commands to be implemented by devices within the ICS 160 (in order to limit any potential negative impact from the newly recognized security attack).

If there is not additional information in the threat intelligence database maintained by the threat intelligence processor 220, the information (e.g. the indicators and TTP STIX data messages generated by the event management processor 230) is then stored in both the threat intelligence database and the local STIX database 214, preferably in a cache memory, maintained by the connection processor 210.

If similar information exists, the following processing steps are initiated. The connection processor 210 determines whether there is any additional information in the STIX messages sent by the event management processor 230 that it does not currently have in its local STIX database 214. If the connection processor 210 determines that new (any additional) information does exist, the new (any additional) information is then stored in both the threat intelligence database and the local STIX database 214, preferably in a cache memory, maintained by the connection processor 210. The connection processor 210 then determines the appropriate course of action STIX messages, formats a data construct containing this information and forwards the data construct to the course of action processor 240 for automatic implementation. The course of action processor 240 receives the data construct from the connection processor 210 and converts the information contained in the STIX messages to instructions and commands 242 to be implemented by devices within the ICS 160 (in order to limit any potential negative impact from the newly recognized security attack).

As a further processing step, the course of action processor 240 compares the instructions and commands 242 with information stored in a database 244 that defines a set of pre-determined actions (instructions and commands) to determine whether a pre-determined automated action is defined for that type of instruction set. If a pre-determined automated action is identified, the course of action processor 240 then executes the pre-determined action(s).

If a pre-determined automated action is not identified, the course of action processor 240 forwards the instruction to a human analyst 105 for manual processing, and adds the response from the human analyst 105 to the set of actions database 244 as an automated process.

If the instruction set of courses of action(s) comes with a flag of already processed the course of action processor 240 determines whether all of the course of action instructions 242 have already been implemented (e.g. within the domain, or within the ICS 160), and if they have not already been implemented, the course of action processor 240 processes and re-executes the course of action instructions. Otherwise, if all of the course of action instructions 242 have been processed, the course of action processor 240 sends an alert to the human analyst 105 that informs the analyst that no adequate course of action exists. For the situation where no adequate course of action exists, the human analyst 105 has the option of constructing a string of one or more commands that can be executed as new course of action instructions (242) by the course of action processor 240. For example the commands may include actions such as closing a specific port on a firewall and/or blocking a specific IP address. The newly constructed course of action instructions can also be saved for future use (by the course of action processor 240) in the set of actions database 244.

In a second example processing operation, the event management module 130 and the event management processor 230 processes all events (alerts and logs) received as IT activity data 163 and/or OT activity data 167, and extracts a complex attack pattern out of this data 163, 167. The event management processor 230 may then determine that the extracted attack pattern and any associated signature is similar or nearly identical to a known attack pattern, for example, Night Dragon or Stuxnet style targeted attacks.

Since the pattern is recognized as being contained in the pattern recognizer database by the event management processor 230, the event management processor 230 shares the extracted attack pattern with the connection processor 210 so that the connection processor 210 is aware of a new attack being launched against the ICS 160. The event management processor 230 then sends relevant courses of action (in the form of one or more STIX messages) to the course of action processor 240. The connection processor 210 performs a search within its local STIX database 214 (local cache) to identify any information about the known attack pattern.

If information about the known attack pattern is identified within the local STIX database 214, the connection processor 210 then extracts the corresponding course of action STIX messages, and formats a data construct containing this information. The connection processor 210 then forwards the data construct to the course of action processor 240 along with a flag defining an "already processed" status to confirm whether in fact the instructions and commands associated with the course of action STIX message(s) were in fact implemented by the course of action processor 240.

If information about the known attack pattern is not identified within the local STIX database 214, the connection processor 210 sends a request to the threat intelligence processor 220 to retrieve all data related to the known attack pattern. Any data related to the known attack pattern is then returned to the connection processor 210 and stored in the local STIX database (cache). Based on the data returned by the threat intelligence processor 220, the connection processor 210 then extracts the corresponding course of action STIX messages, and formats a data construct containing this information. The connection processor 210 then forwards the data construct to the course of action processor 240 along with a flag defining an "already processed" status to confirm whether in fact the instructions and commands associated with the course of action STIX message(s) were in fact implemented by the course of action processor 240.

The processing steps in this second example then continue in a manner similar to those in the first example. More specifically, the course of action processor 240 compares the instructions and commands 242 with information stored in a database 244 that defines a set of pre-determined actions (instructions and commands) to determine whether a pre-determined automated action is defined for that type of instruction set. If a pre-determined automated action is identified, the course of action processor 240 then executes the pre-determined action(s).

If a pre-determined automated action is not identified, the course of action processor 240 forwards the instruction to a human analyst 105 for manual processing, and adds the response form the human analyst 105 to the set of actions database as an automated process.

If the instruction set of courses of action(s) comes with a flag of already processed the course of action processor 240 determines whether all of the course of action instructions 242 have already been implemented (e.g. within the domain, or within the ICS 160), and if they have not already been implemented, the course of action processor 240 processes and re-executes the course of action instructions. Otherwise, if all of the course of action instructions 242 have been processed, the course of action processor 240 sends an alert to the human analyst 105 that informs the analyst that no adequate course of action exists. For the situation where no adequate course of action exists, the human analyst 105 has the option of constructing a string of one or more commands that can be executed as new course of action instructions (242) by the course of action processor 240. For example the commands may include actions such as closing a specific port on a firewall and/or blocking a specific IP address. The newly constructed course of action instructions can also be saved for future use (by the course of action processor 240) in the set of actions database 244.

In some implementations, the connected security system 110 processes data related to security events, provides visualization data related to the security events, and takes action based on the security events. For example, the connected security system 110 may process data related to security events that may affect an ICS environment 160 that has an information technology (IT) network 161 and an operational technology (OT) network 165, and take action to prevent adverse effects on the ICS 160. The networks 161 and 165 can be in communication, for example, over a demilitarized zone (DMZ) of the IT network 161 and a DMZ of the OT network 165. Each of the networks 161 and 165 can include local and wide area networks (LAN/WAN) and wireless networks, and can be used to integrate various computing devices, such as servers, mainframes, desktops, laptops, tablets, smartphones, and industrial control devices and sensors, that may run on multiple different operating systems and may employ multiple different communication protocols.

The IT network 161 can include various IT devices 162, such as an enterprise network, computing devices (e.g., servers, laptop computers, etc.), input/output devices, and/or subsystems. Similarly, the OT network 165 can include various OT devices 166, such as computing devices, input/output devices, and/or subsystems. For example, the OT devices 166 can include a supervisory system, a historian server, an application server, one or more human-machine interface (HMI) devices, one or more controller devices, one or more sensor devices, and/or other appropriate industrial control devices. The supervisory system can coordinate one or more low-level controls and/or low-level sensors. In the present example, the supervisory system can provide data to and receive data from the controller devices and sensor devices. For example, the supervisory system may send control data that causes a control device to perform an operation based on sensor data received from one or more sensor devices. In a particular example, the supervisory system may send data that causes a valve to open based on a temperature of a mixture in a tank specified by sensor data received from a temperature sensor. The historian server, for example, can store, maintain, and provide information related activities performed by each controller device and sensor data provided by each sensor device in the OT network 165. The application server, for example, can host applications that may operate within the OT network 165.

The example event management module 130 can receive IT activity data 163 that includes event/alert data from the IT network 161 and can receive operational technology (OT) activity data 167 that includes event/alert data from the OT network 165. In some implementations, the IT activity data 163 and/or the OT activity data 167 may include log data provided by one or more security sensors. For example, the ICS 160 may include one or more security sensors, such as network based (NIDS) and host based (HIDS) intrusion detection systems, intrusion preventions systems (IPS), anti-virus systems, firewalls, and other detection/logging services (e.g., web server logs, database logs, etc.). The security sensors can monitor communications to and from computing devices included in the IT network 161, the OT network 165, and/or their respective DMZs, and can monitor system activity associated with the devices. Data associated with potentially malicious activity may be detected (and optionally recorded) by the security sensors and provided to the event management module 130.

The IT activity data 163 and the OT activity data 167 can include event and/or alert data. In general, security events are atomic pieces of data associated with communications and system activity, whereas alerts may be triggered in response to an event or a sequence of events. Data provided by security sensors, for example, may include alert data. Data provided by a host (e.g., computing server), controller device, or sensor device, or data included in log files, for example, may include event data.

The event management system 130 can receive the IT activity data 163 and the OT activity data 167, and can standardize, filter, aggregate, and correlate the data to detect anomalies and potentially malicious activity associated with multi-stage, multi-domain attacks. Some example multi-stage, multi-domain attacks include Stuxnet, Night Dragon Dragonfly, and Shamoon. As described in more detail below, output of the event management system 130 can be provided to another system or module (e.g., the threat intelligence module 120) and/or to a system operator as reporting/visualization data. Based on the output, for example, appropriate courses of action may be employed to counter ongoing and/or future attacks.

In the present example, the IT network 161, the OT network 165, and/or their respective DMZ can each have different characteristics (e.g., architecture, resources, protocols, and standards), and each domain may be susceptible to different security threats. Occasionally, correlations may not be detected among events/alerts within a single domain, (and if correlations are detected, the extent of an associated compromise may not be entirely known), but correlations may be detected among events/alerts across multiple domains. By correlating data from multiple domains (e.g., across the IT network 161, the OT network 165, and/or their respective DMZs), for example, complex attacks (e.g., multi-stage, multi-domain attacks executed over time) may be detected, and a single vantage point may be provided to security technicians).

Upon receiving the IT activity data 163 and the OT activity data 167, the event management module 130 can use a filter 131 to filter the data. For example, the event management module 130 can use the filter 131 to filter out irrelevant (or "false") events/alerts from the IT activity data 163 and the OT activity data 167. In some implementations, the filter 131 includes an information technology (IT) activity data filter for filtering the IT activity data 163 and an operational technology (OT) activity data filter for filtering the OT activity data 167.

The filtered data can be provided to an aggregator 132. In general, the event management module 130 can use the aggregator 132 to remove duplicate and/or redundant events/alerts, to combine events/alerts related to the same attack, and to combine events/alerts relating to different attacks but possessing similar characteristics, thus reducing the number of events/alerts under consideration.

After aggregating the event/alert data, for example, aggregated data can be provided by the aggregator 132 to a correlator 133. In general, the event management module 130 can use the correlator 133 to generate a chain of events/alerts that may correspond to a threat scenario. The event management module 130 can also use a pattern recognizer and extractor 134 to identify anomalous and/or malicious activity associated with the threat scenario, and to further describe and/or enrich threat scenario information. In some implementations, the pattern recognizer and extractor 134 also uses data provided by a threat intelligence data source to identify and enrich the anomalous and/or malicious activity patterns. The patterns may include paths represented by security events linking one or more assets. The pattern recognizer and extractor 134 can compare the identified anomalous and/or malicious activity paths to known attack techniques and patterns to determine whether the identified path matches a known attack pattern. The event management module 130 can provide data related to the identified anomalous and/or malicious activity (e.g., including data identifying a known attack pattern that the identified attack pattern matches) to the threat intelligence module 120.

In some implementations, the event management module 130, the threat intelligence module 120, and the course of action module 140 share data (e.g., communicate data between each other) using a predefined data structure. The predefined data structure can include multiple different data constructs and/or a structured language for specifying data related to security events. The different data constructs can each be used to communicate particular types of data or groups of data. For example, each data construct can include a predefined set of data fields that can be populated with data related to security events, attack patterns, threat actors, and other appropriate types of data. An example of a predefined data construct that may be used by the modules 120, 130, and 140 is the Structured Threat Information Expression (STIX™) structured language.

Each module 120, 130, and 140 can generate and/or modify particular data constructs for consumption by other modules. For example, the event management module 130 can generate, based on the IT activity data 163 and/or the OT activity data 167, incident data constructs 135, indicator data constructs 136, and (threat) actor data constructs 137. The constructs can be stored for later retrieval and use by the modules 120, 130, and 140. For example, if an actor data construct 137 has already been created for a particular malicious actor (as described below), the event management module 130 may retrieve the actor data construct 137 for the actor and update the actor data construct 137 with new data (e.g., new data for a new security event believed to be caused by the actor).

The incident data constructs 135 can include data describing particular (e.g., discrete) security incidents. For example, the incident data constructs 135 can include fields for data regarding devices or other assets affected by the incident, the type of devices or assets affected by the incident, the time at which the incident occurred, a threat actor that caused the incident (or is predicted to have caused the incident), the impact of the incident, actions taken in response to the incident, and/or other appropriate data regarding the incident.

The event management module 130 can generate one or more incident data constructs 135 and populate the fields of the incident data constructs 135 based on security incidents identified in the IT activity data 163 and/or the OT activity data 167. For example, when the event management module 130 identifies a security event in the IT activity data 163 and/or the OT activity data 167, the event management module 130 can generate an incident data construct 135 for the identified security event and populate the fields of the generated incident data construct with information related to the identified security event (e.g., data included in the IT activity data 163 and/or the OT activity data 167). The event management module 130 can generate an incident data construct 135 for one or more related security events. For example, the event management module 130 may generate an incident data construct for each chain of events/alerts that may correspond to a threat scenario (e.g., as determined by the correlator 130) and/or for each identified anomalous and/or malicious activity path (e.g., as identified by the pattern recognizer and extractor 134.

In some implementations, the event management module 130 generates an incident data construct 135 for each identified anomalous and/or malicious activity path that has a risk score that satisfies a specified threshold (e.g., by meeting or exceeding the threshold). The risk score for a path can be based on a distance between nodes in the activity path, an importance of nodes in the path, and/or an amount of time that transpires between communication events in the path.

The indicator data constructs 136 can include data describing observable patterns (e.g., attack patterns) identified by the event management module 130. For example, the indicator data constructs 136 can include fields for data regarding confidence in the pattern being valid, time periods in which the pattern is valid, likely impact of the pattern, sightings of the pattern, structured test mechanisms for detection of the pattern, related campaigns, suggested courses of action for mitigating the pattern, related observables, the source of the pattern, and/or other appropriate data.

The indicator data construct 136 can include one or more observable data constructs. An observable data constructs can represents a single cyber observable. For example, an observable may be an IP address or a hash value. The observable data construct can include a sighting count for the observable. The sighting count can represent the number of times the observable has been detected in the IT activity data 163 and the OT activity data 167.

The event management module 130 can generate one or more indicator data constructs 136 and populate the fields of the indicator data constructs based on attack patterns detected by the event management module 130. For example, the event management module 130 can generate an indicator data construct 136 for each detected attack pattern.

The actor data constructs 137 can include data describing potential malicious actors that may cause security incidents. For example, the actor data constructs 137 can include fields for data identifying the actor and/or data that characterize the actor. The actor data constructs 137 can also include data regarding the suspected motivation of the actor, the suspected intended effect of security incidents or attack patterns caused by the actor, historically observed tactics, techniques, and procedures (TTPs) used by the actor historical campaigns believed to be associated with the actor, other actors believed to be associated with the actor, confidence in the characterization of the actor, the source of the data regarding the actor, and/or other appropriate data regarding the actor.

The event management module 130 can generate an actor construct for any newly identified actors, e.g., found in the IT activity data 163 and/or the OT activity data 167. For example, when the event management module 130 identifies a security event in the IT activity data 163 and/or the OT activity data 167, the event management module 130 may generate an actor data construct 137 for the actor associated with the security event. The event management module 130 may also populate the fields of the generated actor data construct 137 with data available to the event management module 130, e.g., the security event and/or attack pattern associated with the actor. For example, the event management module 130 may populate the actor data construct 137 with an IP address found in the IT activity data 163 and/or the OT activity data 167 and that is identified as being the source of the security event.

The event management module 130 can transmit the incident data constructs 135, the indicator data constructs 136, and/or the actor data constructs 137 to the threat intelligence module 120. As described in more detail below, the threat intelligence module 120 can enrich the data included in the incident data constructs 135, indicator data constructs 136, and actor data constructs 137. In addition, the threat intelligence module 120 can generate additional data constructs based on the incident data constructs 135, indicator data constructs 136, and actor data constructs 137.

In some implementations, the threat intelligence module 120 is an intelligence-driven threat mitigation system. One objective of the threat intelligence module 120 is to specifically identify threat outcomes that an organization, for example an oil and gas pipeline operator that conducts business an/or industrial operations using the exemplary ICS 160, will actually face based on the equipment and operations that are part of the organization's ongoing operations. In one exemplary implementation, the current threat landscape and the threat actors whom are part of the landscape are documented by machine-process-able intelligence information that is collected and normalized based on an industry-specific threat model. For example, the threat intelligence module 120 can receive threat data 175 that identifies current and/or potential threats to the organization. In a particular example, the threat data 175 may be received from one or more third party threat data feeds 170 (e.g., public and/or proprietary feeds) that include data related to security events and alerts that have been detected, e.g., by one or more security sensors. The threat data 175 can also include unstructured threat data (e.g. blogs and advisories), commercial threat databases, and/or other public information related to security events and alerts.

In some implementations, the threat data 175 is custom to the organization. For example, an organization may subscribe to particular databases and feeds based on the organization's risk and/or the organization's equipment and operations. In a particular example, an organization that manages a pipeline may subscribe to a feed that provides threat data related to pipelines and associated equipment.

In some implementations, the threat intelligence module 120 obtains threat data 175 from external, third party, or other internal threat feeds 170 based on data received from the event management module 130. For example, threat intelligence module 120 may obtain threat data based on data constructs received from the event management module 130. In a particular example, the event management module 130 may provide to the threat intelligence module 120 an actor data construct 137 that includes an unknown IP address that may have caused a security incident on the IT network 161 or the OT network 165. In this example, the threat intelligence module 120 may query the threat data feeds 170, threat data 175 received from the threat data feeds 170, and/or other threat information sources for additional data related to the unknown IP address. If the IP address has been involved in other security events or attacks, e.g., on other organizations, the threat data feeds 170 may have data identifying the actor associated with the IP address, other security events or attack patterns originating from the IP address or the actor associated with the IP address, and/or other data regarding the actor. The threat intelligence module 120 may also obtain other information, such as domain names to which the IP address resolves and when the IP address has resolved to the domain name. This data can enhance the confidence that actions associated with that actor were either malicious or safe. For example, if the IP address resolves to a reputable organization's domain, then the threat intelligence module 120 may determine that the IP address is not malicious.

The threat intelligence module 120 can enrich the actor data construct 137 that included the unknown IP address with the data obtained from the threat data feeds 170 or other sources. For example, the threat intelligence module 120 may populate fields of the actor data construct 135 with the data obtained from the threat data feeds 170 or other sources.

Similarly, the threat intelligence module 120 can enrich the data included in the incident data constructs 135 and indicator data constructs 136 received from the event management module 130. For example, the threat intelligence module 120 may query the threat data feeds 170, threat data 175 received from the threat data feeds 170, and/or other threat information sources for additional data related to security events identified in the incident data constructs 135 and attack patterns identified in indicator data constructs 136.

In some implementations, the threat data 175 received from the threat data feeds 170 may include data constructs of the predefined data structure. For example, the threat data 175 may include incident data constructs 135, indicator data constructs 136, actor data constructs 137 and/or other data constructs described herein. In this example, the threat intelligence module 120 can extract data from fields of the data constructs included in the threat data 175 and populate/update/merge the data constructs received from the event management module 130 with the extracted data.

The threat intelligence module 120 can also generate data constructs, such as campaign data constructs 122, exploit target data constructs 124, and course of action constructs 126. The campaign data constructs 122 can include data describing a set of malicious actors, TTPs, observables, and/or security incidents determined to be involved in a same or similar campaign. For example, a campaign data construct 122 can include a set of malicious actors, TTPs, observables, and/or security incidents that are determined, e.g., by the threat intelligence module 120, to be a part of a common campaign or to have a same or similar intent or desired effect. For example, the threat intelligence module 120 may generate a campaign data construct 122 for set of malicious actors, TTPs, observables, and/or security incidents that have a same or similar intent or desired effect. In a particular example, the threat intelligence module 120 may generate a campaign data construct 122 for actors and security incidents directed to causing pipeline outages by targeting controls systems of the pipelines. In some implementations, each campaign data construct 122 is generated for a particular intent different from the intent of each other campaign data construct.

In some implementations, the threat intelligence module 120 identifies a campaign based on data included in incident data constructs 135, indicator data constructs 136, and/or actor data constructs 137 received from the event management module 130. For example, different IP addresses may be detected in the IT activity data 163 and/or the OT activity data 167. If there are no particular incidents or observables associated with the IP addresses, that be bundled together as a campaign, along with any additional information that the threat intelligence module 120 obtains for the IP addresses (e.g., data related to other organizations that have reported detecting the IP addresses).

Each campaign data construct 122 can include data regarding a suspected intended effect of the actors, incidents, TTPs, and observables of the campaign, related TTPs leveraged within the campaign, the related incidents believed to be part of the campaign, actors believed responsible for the campaign, other campaigns that are believed to be related to the campaign, confidence in the assertion of intent and characterization of the campaign, courses of action taken in response to the campaign, the source of the campaign information, and/or other appropriate data regarding the campaign. The data can be obtained from the incident data constructs 135, the indicator data constructs 136, the actor data constructs that have been enriched with data by the threat intelligence module 120.

The exploit target data constructs 124 can include data regarding weaknesses and/or vulnerabilities (e.g., technical vulnerabilities) of the IT network 161, the OT network 165, and or security devices used to protect the IT network 161 and OT network 165. For example, an exploit target data construct may include data regarding weaknesses or vulnerabilities that may be exploited by malicious actors.

The exploit target data constructs 124 can include fields for data regarding identifications or characterizations of weaknesses or vulnerabilities, potential courses of action to mitigate the weaknesses or vulnerabilities, source of the weakness or vulnerability data, and/or other appropriate weakness or vulnerability data.

The data included in the exploit target data constructs can be identified based on security events detected by the event management module 130 and/or the threat data 175. For example, if an anomalous and/or malicious activity path identified by the event management module 130 includes security events arising from attempted or successful access of a port that was assumed to be blocked, the threat intelligence module 130 may identify a vulnerability or misconfiguration of a gateway that allows access to the port. In another example, the threat data 175 may include data from a feed that specifies vulnerabilities of specific pieces of equipment.

The threat intelligence module 120 can also analyze potential threats to the ICS 160 and recommend courses of action based on the threats. For example, attack paths based on the organization's architectural framework can be documented and used by the threat intelligence module 120 to determine the organization's risk for one or more outcomes. Risk scores for a particular kind of risk or particular outcome, for example a disruption operation planned covertly by a threat actor, are determined based on whom the threat actors are, and their currently understood levels of activity as indicated by the threat data 175 and/or the data constructs received from the event management module 130. Scoring can take place on multiple levels and, as discussed below, the security administrator using the connected security system 110 can drill down to see the finer details. The exploit that is most likely to be successful for the current threat actor is tied to its known characteristics as maintained in authoritative systems of record like the Common Vulnerabilities and Exposures (CVE) database and links to this data are provided. Using additional analytical tools such as a network resource management system, the threat intelligence module 120 can determine how patterns of behavior that possibly indicate active compromises can be seen in network relationships between assets involved in, for example, pipeline operations. The network resource management system, for example, can examine and correlate the source and destination of network traffic and the types and amounts of this traffic with historically normal patterns of behavior.

The threat intelligence module 120 can use the threat data 175 and the data constructs received from the event management module 130 to determine a risk score for one or more potential outcomes and based on one or more threat paths. The threat intelligence module 120 can use the risk scores and threat data to determine and prioritize courses of action to mitigate the risk(s). For example, a course of action may include blocking communication between an enterprise network (or the Internet) and operational devices (e.g., a control device located at an industrial facility). In a particular example, a course of action may include updating the policy or patches of a gateway that facilitates communication between multiple different parts of the ICS 160 or instructing the gateway to block all communication between the different parts of the ICS 160.

The threat intelligence module 120 can also determine courses of action based on business processes of an organization. For example, the threat intelligence module 120 may maintain data regarding dependencies that business process has on assets of the organization. The threat intelligence module 120 can use the threat data and data constructs to determine which business processes may be at risk and/or what assets may be at risk. For example, if a particular malicious actor specified in a threat feed has been targeting a particular asset of the organization that is critical to a particular business process of the organization, the threat intelligence module 120 may determine that the particular business process is at risk. In response, the threat intelligence module 120 can identify a course of action that mitigates the risk.

The threat intelligence module 120 can also prioritize courses of action based on the business processes that are determined to be at risk. For example, some business processes of an organization may be more critical than others. The threat intelligence module 120 may prioritize the business processes based on the importance of the business processes for the organization and risk scores for each business process.

The course of action may be automated, semi-automated, or manual. For an automated course of action, the threat intelligence module 120 may provide data specifying the course of action to the course of action module 140. In turn, the course of action module 140 implements the course of action. For example, the course of action module 140 may utilize software defined networking to turn off a gateway between a control device and a network to protect the control device and its associated equipment from a potential attack on the network.

For a semi-automated course of action, a security administrator may be prompted to select a recommended course of action. In this example, the threat intelligence module 120 may provide a recommended course of action to the course of action module 140. The course of action module may then provide data describing the recommended course of action to a visualization generator 125. The visualization generator 125 can generate and provide to a user device 105 (e.g., computer, smart phone, tablet, etc.) a user interface that describes recommended courses of action and the security event or attack for which the course of action is recommended. The security administrator can use the user interface to initiate the course of action or reject the course of action.

A security administrator can also implement a manual course of action, for example, based on a security event or attack presented to the security administrator. For example, the visualization generator 125 may provide a user interface that allows the security administrator to select from multiple courses of action or to specify a course of action.

The threat intelligence module 120 can provide data describing courses of action to the course of action module 140 using the course of action data construct 126. The course of action data construct 126 can include, for a particular course of action, includes data describing courses of action that may be taken in response to a particular security event, attack pattern, or campaign. For example, this data can include data regarding the objective of the course of action, the efficacy of the course of action, the likely impact of the course of action, the cost of the course of action, and/or other appropriate data regarding the course of action.

The course of action module 140 can implement automated, semi-automated, and manual courses of action. For example, the course of action module 140 can communicate course of action data 142 with gateways on the IT network 161 and/or the OT network 165. The course of action data 142 can include instructions for the gateways and/or policies, updates, or patches to security software executed by the gateways.

The course of action module 140 can provide to the threat intelligence module 120 data related to implemented courses of action. For example, this data may specify courses of action that a security administrator initiated based on a recommendation by the threat intelligence module 120 and the results of implemented courses of action (e.g., whether automated, semi-automated, or manually). The threat intelligence module 120 can use this data when analyzing future security events and determining courses of action. For example, if the course of action included blocking access to a particular port and/or patch a particular gateway due to the port and/or gateway being targeted. In this example, the number of security events being detected at the port and/or gateway should be reduced by the course of action. If not, the threat intelligence module 120 may recommend a different course of action.

The course of action module 140 can also provide data regarding TTPs to the event management module 130. The data regarding TTPs can be provided using a TTP data construct 138 of the predefined data structure. The TTP data construct can include fields for data describing the behavior of malicious actors. For example, this data can include data regarding organizations or people targeted by the malicious actor, attack patterns and/or malware used by the malicious actor, and other resources used by the actor. The event management module 130 can use this data to update the scoring of identified anomalous and/or malicious activity paths. For example if a particular path corresponds to a known TTP, the event management module 130 may increase the score of the particular path to reflect its known risk.

The visualization generator 150 can generate various visualizations (e.g., user interfaces) based on data received from the threat intelligence module 120 and/or the event management module 130. These visualizations provide data related to security events and attacks related to an organization's equipment and operations, such as to the organization's ICS. The visualizations illustrate attack paths that can lead to various outcomes and that are based on one or more security events associated with one or more different malicious actors. The visualizations can also allow a security administrator to drill down for more detailed information related to particular security events, paths, and outcomes.

The visualization generator 150 can also generate visualizations for course of action. For example, the course of action module 140 can provide data regarding recommended courses of action to the visualization generator 150. In turn, the visualization generator 150 can generate a user interface for presenting the recommended courses of action and for receiving a selection of a course of action from the security administrator. In addition, the visualization generator 150 can generate user interfaces for receiving manual courses of action from the security administrator.

FIGS. 2-10 depict example screen shots of user interfaces that are generated in accordance with implementations of the present disclosure. The example screen shots depicted in FIGS. 2-10 relate to security threats faced by an example organization. The example screen shots can be generated by the visualization generator 125 of FIG. 1A and for presentation at the user device 105 of FIG. 1A. For example, the connected security system 110 may provide visualization data generated by the visualization generator 125 to the user device 105. The visualization data may initiate the presentation of the example user interfaces at the user device.

The visualization generator 125 can generate the user interfaces of FIGS. 2-10 based on data generated by the event management module 130, the threat intelligence module 125, or the course of action module 140 of FIG. 1A. For example, the user interfaces may include visualizations generated based on correlated attack data generated by the event management module 130, risk scores determined by the threat intelligence module 120, and/or courses of action provided to the course of action module 140.

Figure 2:
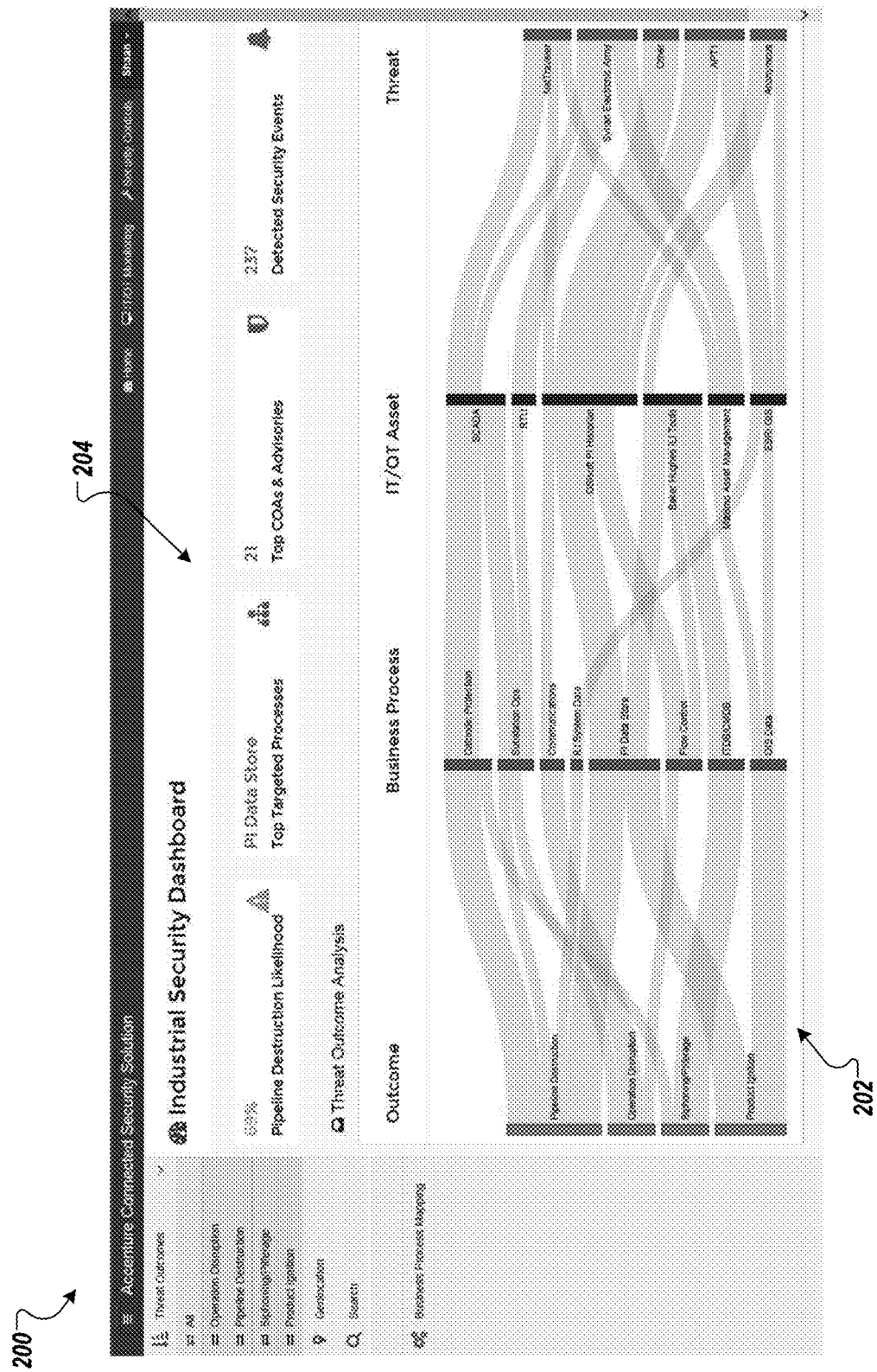

FIG. 2 depicts a screen shot of an example user interface 200 that is generated in accordance with implementations of the present disclosure. The user interface 200 includes a Sankey diagram 202 of an exemplary threat situation model focusing on the connection from outcomes that a cyber actor might want to achieve back through the processes and assets that the actor might be able to compromise to achieve the outcomes.

The Sankey diagram 202 shows a visual representation of the magnitude of flow between nodes in a network, such as the IT network 161 and/or the OT network 165 of FIG. 1. In particular, the Sankey diagram 202 illustrates the flow between particular threats to particular outcomes for an organization. Going from right to left, the Sankey diagram 202 illustrates IT assets and OT assets of the organization that the particular threats, and threat actors, can affect. A link between a particular threat and/or threat actor and a particular asset indicates that the particular threat may affect the particular asset. For example, the Sankey diagram 202 includes links between NetTraveler and a SCADA, a PI Historian, and an Asset Management system. The thickness of the links indicate the likelihood of the particular threat actor (e.g., NetTraveler) of affecting the particular asset. For example, as the link between NetTraveler and SCADA is wider than the link between NetTraveler and the PI Historian, the example Sankey diagram 202 illustrates that it is more likely that NetTraveler will affect the SCADA than the PI Historian. In addition, the links may be color coded to illustrate which threats are more critical than others. For example, links that represent critical threats may be red, while links that represent less critical threats may be yellow.

The Sankey diagram 202 also illustrates links between the IT and OT assets and business processes, and links between the business processes and particular outcomes. For example, the Sankey diagram 202 indicates that threats that if the SCADA can also affect cathodic protection and substation operations. The Sankey diagram also indicates that threats that affect cathodic protection can result in pipeline destruction and operation disruption.

Security administrators can use the user interface 202 to view from a high level how particular threats can impact particular assets and business processes, and the outcomes that the particular threats may cause. By using link width to indicate the likelihood that a particular threat will affect assets, business processes, and outcomes, a security administrator can quickly determine which threats to prioritize.

The likelihoods used to generate the links between threats, assets, business processes, and outcomes can be determined by the threat intelligence module 120 of FIG. 1. For example, the threat intelligence module 120 may determine the likelihoods based on the threat data 150 and correlations between attacks identified by the event management module 130. In a particular example, the likelihood that a particular threat will affect a particular asset may be based on whom the actor is, the actor's current level of activity (as indicated by the threat data 150), the actor's motivation and intent, and the ability of the actor to reach the particular assets.

The likelihood that threats that affect particular assets can impact particular business processes and outcomes can be determined based on the patterns of behavior identified by the event management module 130, the attack paths taken by security events and attacks, the threat data received from external sources, IT and OT activity data, the equipment and operations of the organization, and/or the network configuration. For example, the event management module 130 may determine, using the correlator 136 and the pattern recognizer 138, that particular threats that affect particular assets can impact particular business processes and cause particular outcomes. The threat intelligence module 120 can use this data, along with current threat information (e.g., from external threat data and IT and OT activity data) to determine the risk associated with particular business processes and outcomes.

The example user interface 200 also includes summary data 204 for a particular outcome, e.g., an outcome selected by a security administrator. In this example, the summary data 204 includes data related to the "pipeline destruction" outcome. The summary data 204 includes a risk score that indicates the likelihood of the outcome occurring (i.e. 69%), the top targeted process that could lead to the outcome (i.e., PI Data Store), the top COAs and advisories (i.e., 21), and the number of detected security events (i.e., 237).

Figure 3:
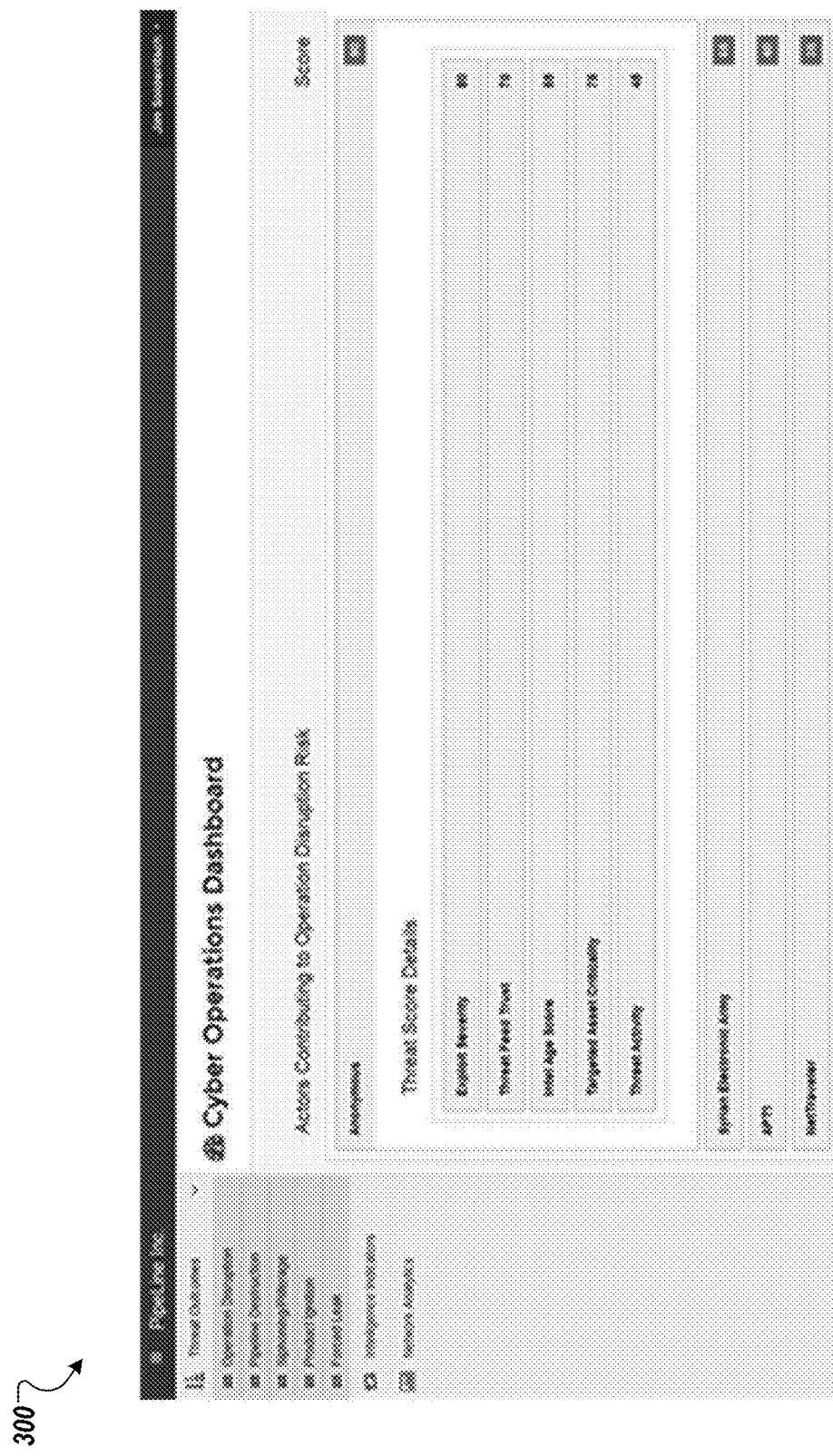

FIG. 3 depicts a screen shot of an example user interface 300 that is generated in accordance with implementations of the present disclosure. The example user interface 200 includes details related to threat actors that contribute to the risk of a particular outcome (operation disruption). The user interface 300 may be presented in response to user interaction with the Sankey diagram 202 of FIG. 2. For example, the user interface 300 may be presented in response to a security administrator selecting the outcome "operation disruption" in the Sankey Diagram 202.

The user interface 300 includes a risk score for each actor that contributed to the overall risk score for the outcome operation disruption. The risk score for each actor indicates the likelihood that the actor will cause the outcome if not mitigated. The overall risk score for the outcome operation disruption is based on each of the risk scores. For example, the overall risk score may be the sum, average, or weighted average of the risk scores for each of the actors.

Figure 4:
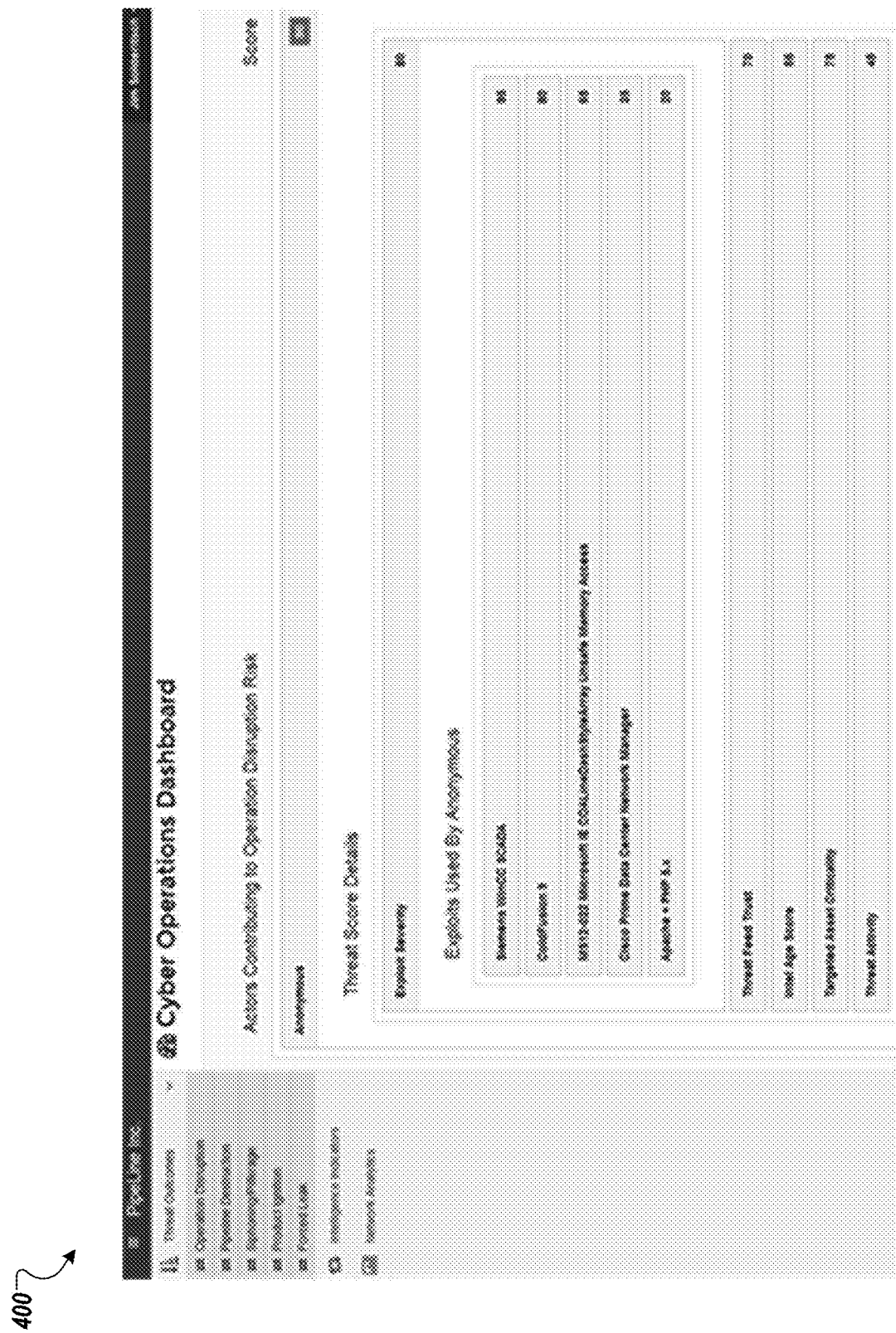

FIG. 4 depicts a screen shot of an example user interface 400 that is generated in accordance with implementations of the present disclosure. The example user interface 400 includes more details related to a particular threat actor (Anonymous) and its risk score for a particular outcome (operational disruption). For example, the user interface 400 may be presented in response to user selection of the "Anonymous" actor in the user interface 300 of FIG. 3.

The user interface 400 presents the sub-scores that are used to determine the risk score for Anonymous and the outcome operation disruption. In this example, the risk score is based on exploit severity, threat feed trust (e.g., based on the trustworthiness of the source of the threat data), intel age (e.g., based on the amount of time since the threat data was received), targeted asset criticality, and threat activity (e.g., based on the number of security events detected for the actor). In this example, the risk score for Anonymous is based on a weighted average of the sub-scores. In other implementations, the risk score may be based on the sum, simple average of the sub-scores, or another appropriate combination of the sub-scores.

Figure 5:
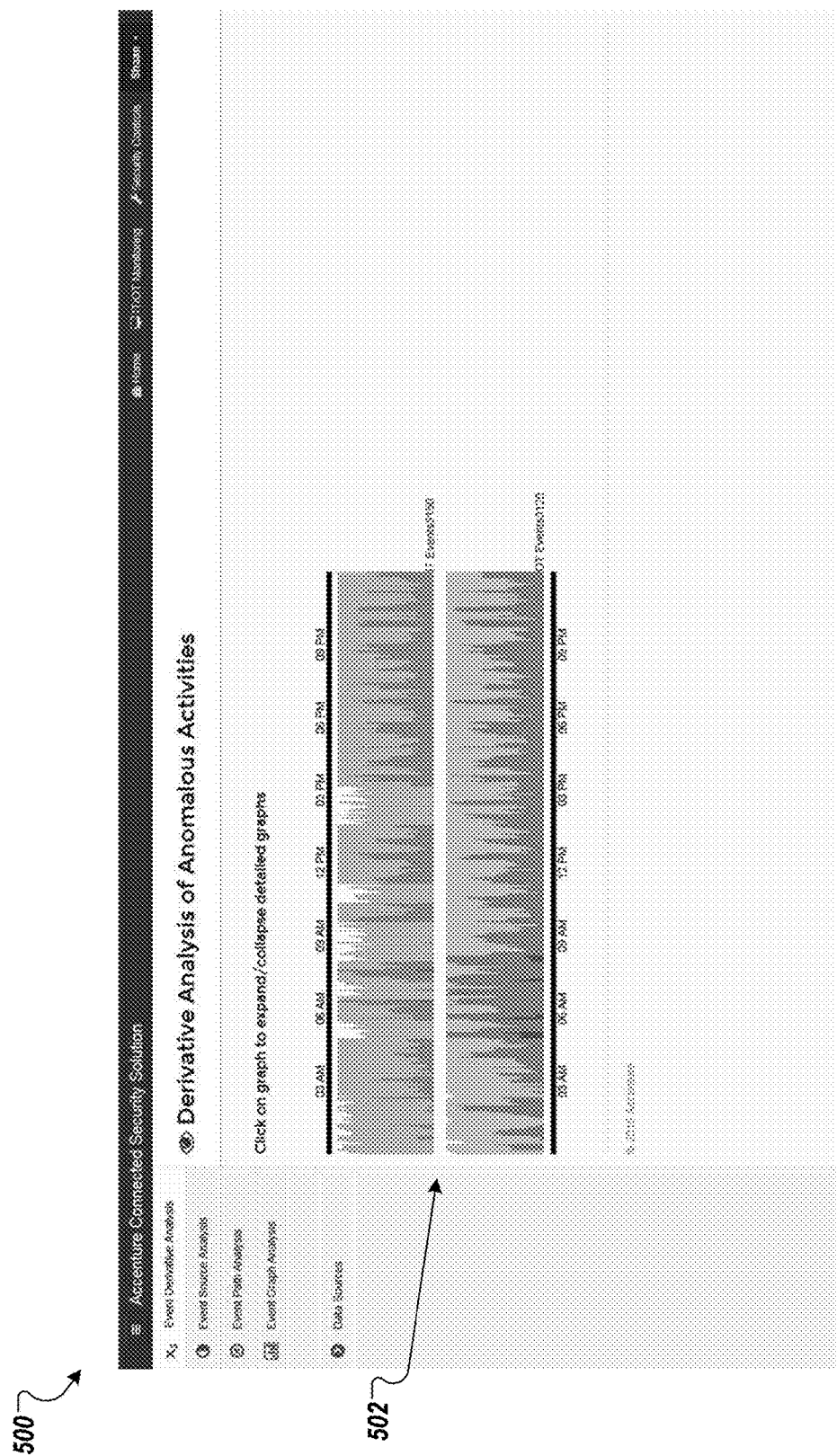

FIG. 5 depicts a screen shot of an example user interface 500 that is generated in accordance with implementations of the present disclosure. The example user interface 500 includes a graph 502 that represents a derivative analysis of anomalous activities. The graph 502 presents the number of security events detected over time. In this example, the graph 502 presents the number of security event detected for an IT network, e.g., the IT network 161 of FIG. 1, and the number of security events detected for an OT network, e.g., the OT network 165 of FIG. 1.

The darkness of the color in the graph 502 can be used to indicate the number of security events. For example, assume that the top range of the graph is 100 security events. If the number of security events for a particular point in time is less than 100, a light shade of a color can be used to indicate the number of events. For example, if the number of security events is 50 the light shade of the color may extend halfway between the bottom and top of the graph at the location on the graph for that particular time. If the number of security events exceeds 100, a darker shade of the color may be used to show the number of security events between 100 and 200. For example, at the location in the graph for that particular time, the light shade of the color may extend to the top of the graph to represent 100 security events. In addition, the darker shade of the color may extend from the bottom of the graph to show the number of security events greater than 100. If the number of security events is 150, the darker shade of the color would extend half way between the bottom and top of the graph.

Figure 6:
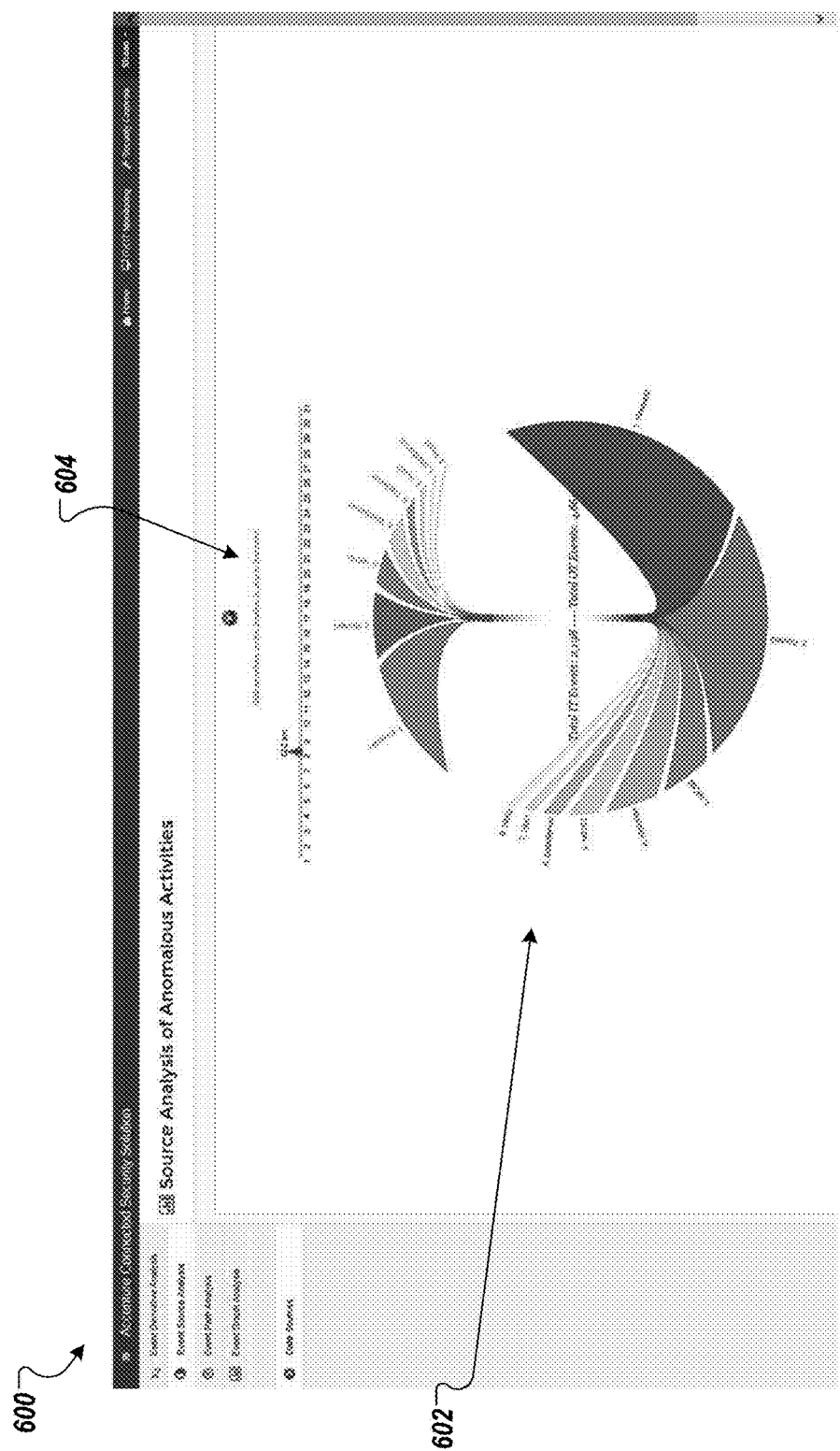

FIG. 6 depicts a screen shot of an example user interface 600 that is generated in accordance with implementations of the present disclosure. The example user interface 600 includes a graph 602 that presents the relative number of security events detected for particular sources over time. In this example, the size of the graph 600 covered by a particular source indicates the number of security events detected for a particular time period. The user interface 600 includes a selectable timeline 604 that allows a security administrator to select the time period for which data should be presented in the graph 600.

Figure 7:
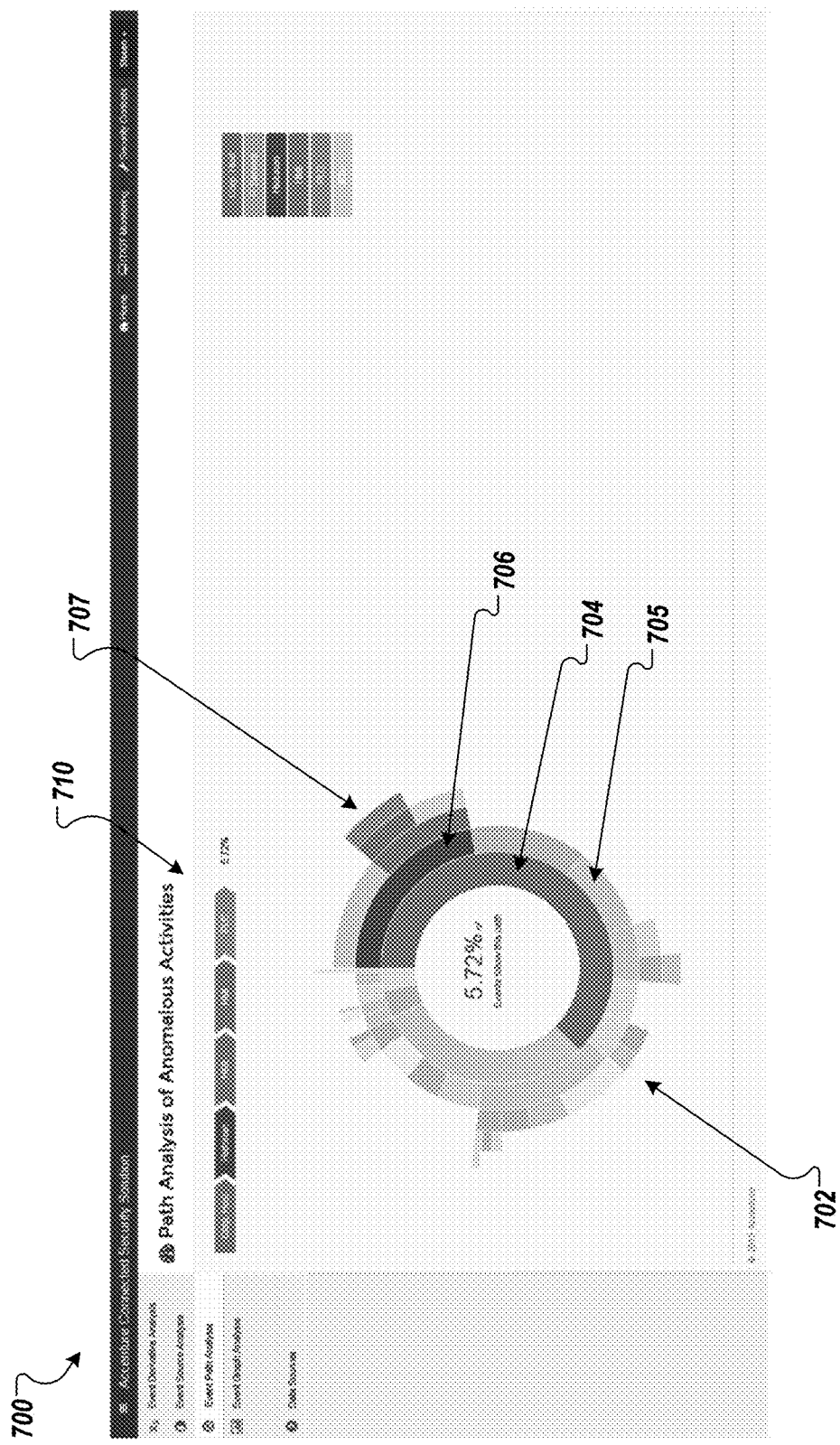

FIG. 7 depicts a screen shot of an example user interface 700 that is generated in accordance with implementations of the present disclosure. The example user interface 700 includes a graph 702 that presents the amount of security events (as a percent of the total number of security events) that follow particular paths of an organization's network(s). In this example, the inner circle of the graph 700 represent components (e.g., computing devices, HMIs, networks) from which security events originate in the organization's network(s). For example, the semicircle 704 represents the amount of security events that originated at a corporate host. Each semicircle outside of the inner circle represents components at which security events were detected based on security events that originated at a component represented in the inner circle. An outer semicircle that is adjacent to an inner semicircle represents security events that followed a path from the component represented by the inner semicircle to the component represented by the outer semicircle. In addition, the size of each semicircle can be based on the amount of security events that followed the path represented by the semicircle.

The amount of security events that follow a particular network path can be identified based on the path from the inner circle to the outer circle for that path. For example, the semicircle 705 represents the amount of security events detected at IT servers and that originated at a corporate host. Similarly, the semicircle 706 represents the amount of security events detected at a Historian and that originated at a corporate host. In addition, the semicircle 707 represents the number of security events that followed a path from a corporate host to a PLC via a Historian, a first HMI, and a second HMI.

A security administrator can select each path, for example, by selecting an outer semicircle of the graph. In response, a path identifier 710 is displayed that shows the selected path and the amount of security events that have taken the selected path.

FIGS. 8 and 9 depict screen shots of example user interfaces 800 and 900 that are generated in accordance with implementations of the present disclosure. The example user interface 800 includes a diagram 802 that presents paths that security events have taken through assets of an organization. Nodes on the graph may be selectable to display assets further along each path along which security events have taken. For example, the user interface 900 shows the diagram 802 after node 910 is selected, showing additional assets in which security events traveled from the corporate hosts.

Figure 10:
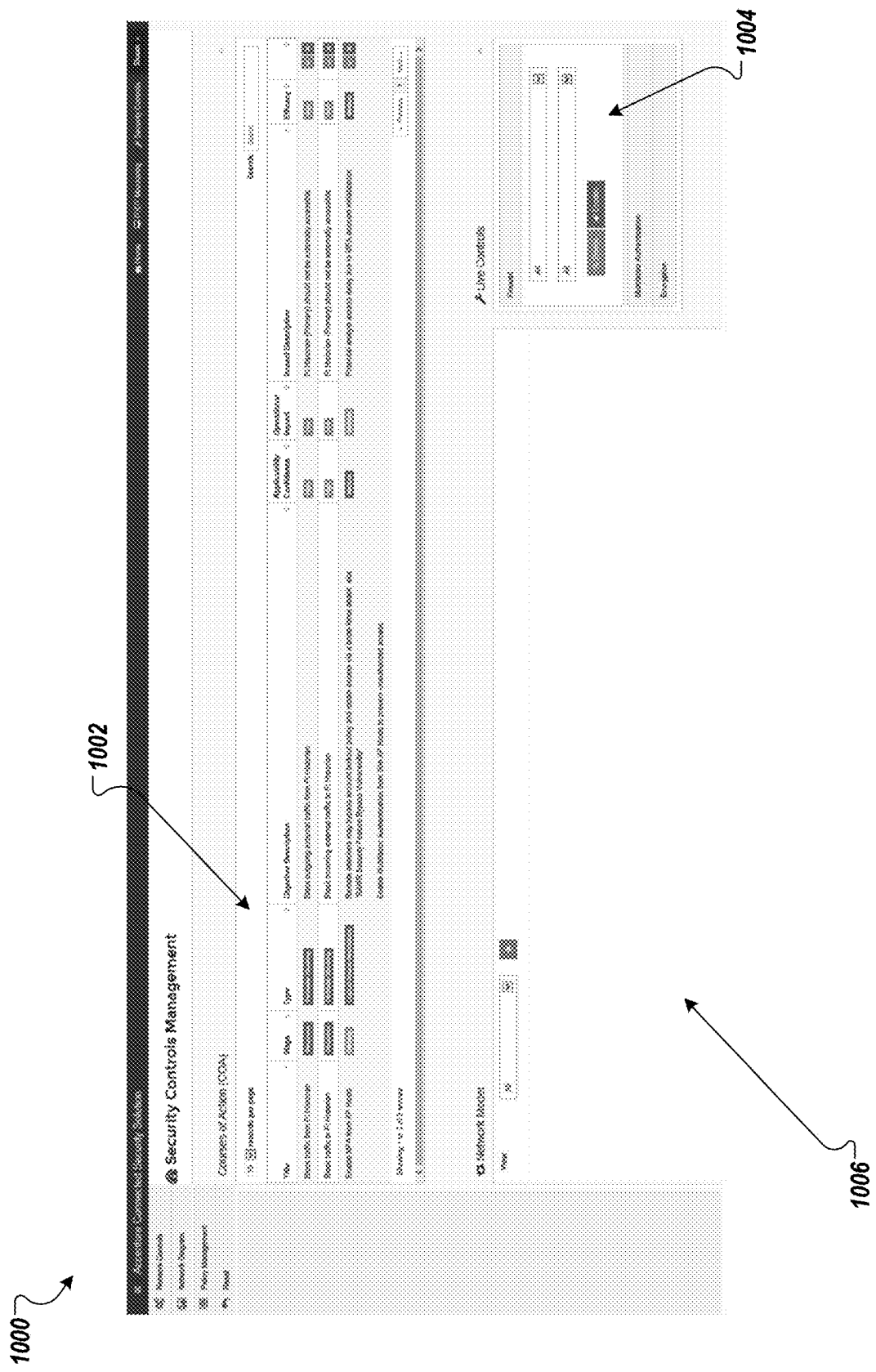

FIG. 10 depicts a screen shot of an example user interface 1000 that is generated in accordance with implementations of the present disclosure. The example user interface 1000 allows security administrators to view active course of action and implement courses of action. In this example, information about three active courses of action 1002 are presented.

A live controls interface 1004 allows security administrators to search for and select manual courses of action to implement. Although not shown, a network diagram 1006 can also be presented in the user interface 1000 to allow security administrators to view the architecture of the network when viewing and implementing courses of action.

In addition, the user interface 100 can display recommended courses of action recommended by the threat intelligence module 120 of FIG. 1A. For recommended courses of action, the user interface 1000 can include a button, icon, or other selectable user interface for selection by a security administrator to initiate the recommended course of action.

Figure 11:
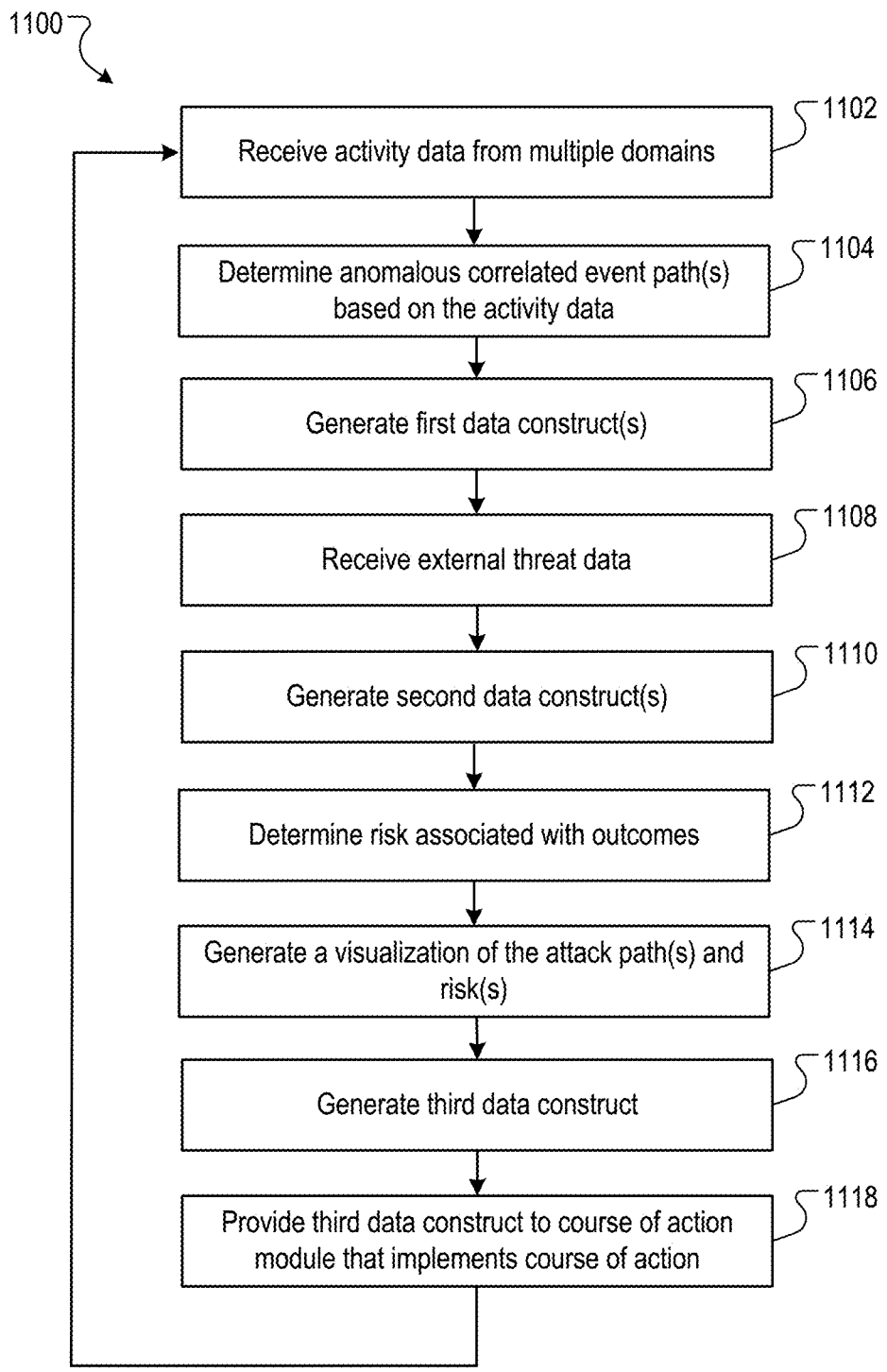
FIG. 11 is a flowchart of an example process that can be executed in accordance with implementations of the present disclosure.

FIG. 11 is a flowchart of an example process 1100 that can be executed in accordance with implementations of the present disclosure. The process 1100, for example, can be performed by systems such as the connected security system 110 of FIG. 1A and the connection processor 210 of FIG. 1B.

Activity data for an organization can be received from multiple domains (1102). Referring to FIG. 1A and as discussed above, for example, activity data (e.g., event/alert data provided by one or more intrusion detection systems) can be received from an IT network and from an OT network. The activity data can include first domain activity data from a first network domain (e.g., from the IT network) and second domain activity data from a second network domain (e.g., the OT network). The activity data can include events, alerts, or both from the respective first and second network domains.

One or more anomalous correlated paths can be determined for the organization based on the activity data (1104). Referring to FIG. 1A and as discussed above, for example, activity data can be filtered, aggregated, and correlated, and patterns can be detected in the activity data. In addition, attack paths can be identified based on the patterns and correlated activity data. The attack paths can identify paths that security events related to one or more assets.

One or more first data constructs are generated (1106). The first data construct(s) can include the first domain activity, the second domain activity data, data describing the one or more anomalous correlated event paths, and/or data identifying a malicious actor associated with the anomalous correlated event paths. For example, the one or more first data constructs can include one or more incident data constructs, one or more indicator data constructs, and/or one or more actor data constructs.

External threat data can be received (1108). Referring to FIG. 1A and as discussed above, for example, threat data can be received from feeds, commercial databases, news articles, and other public sources. These threat data can include data specific to a particular organization and/or to multiple different organizations.

One or more second data constructs are generated (1110). The one or more second data constructs can include data from the one or more first data constructs and at least a portion of the external threat data. For example, the one or more second data constructs can include one or more campaign data constructs and/or one or more exploit target data constructs.

In addition, the data of the first data construct(s) may be enriched with data from the external threat data. For example, an actor data construct may be populated with additional data about the actor extracted from the external threat data.

A risk associated with one or more outcomes is determined (1112). Referring to FIG. 1A and as discussed above, for example, the risk of an outcome occurring can be determined based on previous anomalous correlated event paths, threat data, activity data, and/or the organization's equipment and operations. The risk for an outcome may be in form of a risk score indicative of the risk of the outcome occurring.

One or more visualizations can be generated and provided (1114). Referring to FIGS. 2-10, and as discussed above, for example, visualizations that present attack paths and risks associated with outcomes can be generated and provided to a user device. In addition, one or more recommended courses of action may be included in the visualizations or implemented automatically.

One or more third data constructs are generated (1116). The third data construct(s) may include a course of action data construct that identifies a course of action to be recommended to a user and/or implemented. For example, a course of action may be determined and prioritized based on the risks associated with the one or more outcomes and the business processes affected by each outcome. Data describing the course action can be included in the course of action data construct.

The third data construct(s) are provided to a course of action module (1118). The course of action module can implement the course of action. Or, the course of action module can recommend the course of action to a user. If the user selected the recommended course of action, the course of action module can implement the course of action.

Additional activity data can be received, e.g., after the course of action is implemented. For example, activity data can be received periodically or as events are detected. Each time activity data is received, the process 1100 can be performed to generate data constructs based on the activity. If appropriate, courses of action can be implemented to mitigate malicious activity detected in the activity data.

In some implementations, the first data construct, the second data construct, and the third data construct have a common data structure. For example, the data structure of the first, second, and third data constructs may be based on the STIX structured language.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificiallygenerated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 12:
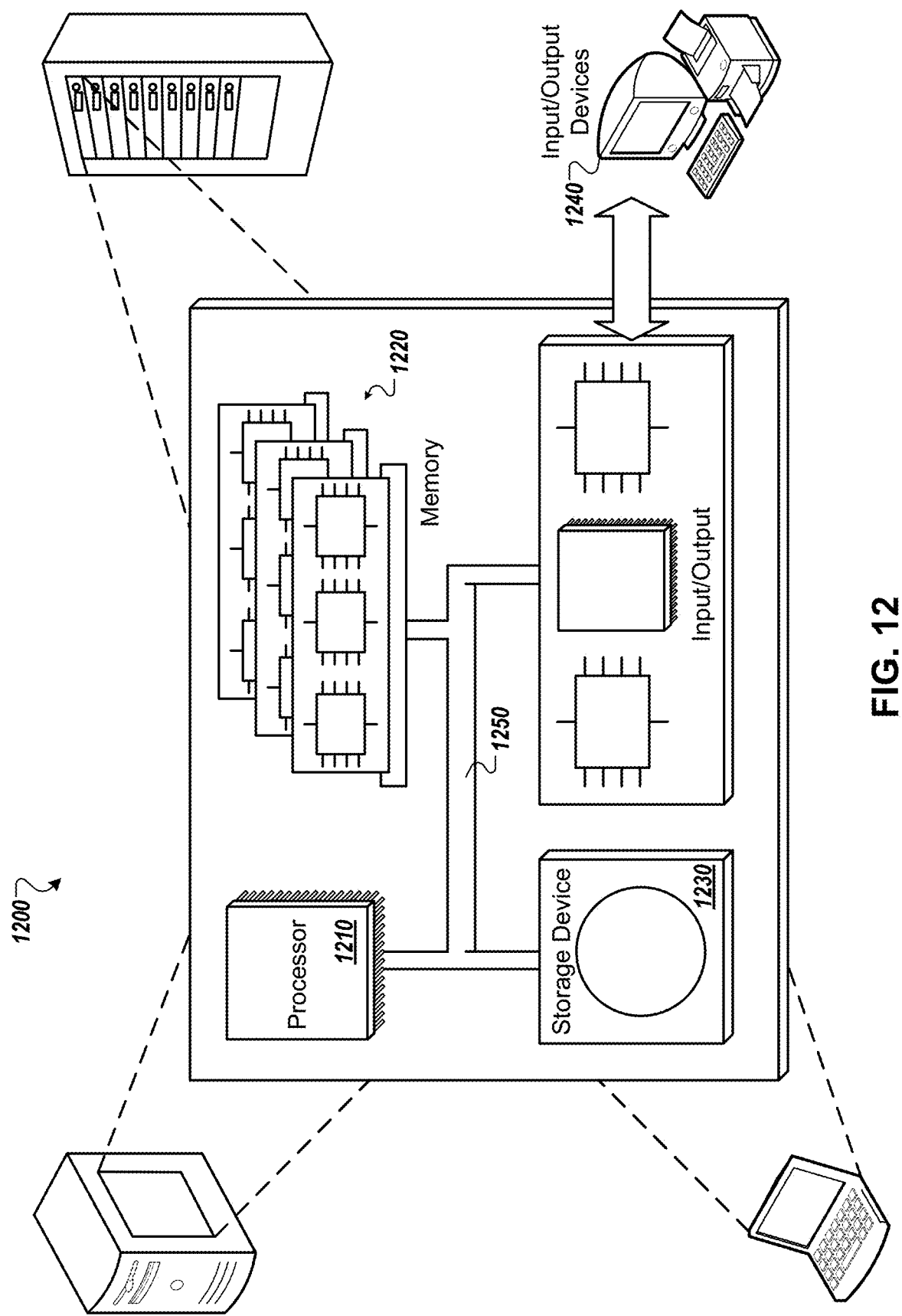
FIG. 12 is a block diagram of a computing system that can be used in connection with computer-implemented methods described in this document.

An example of one such type of computer is shown in FIG. 12, which shows a schematic diagram of a generic computer system 1200. The system 1200 can be used for the operations described in association with any of the computer-implement methods described previously, according to one implementation. The system 1200 includes a processor 1210, a memory 1220, a storage device 1230, and an input/output device 1240. Each of the components 1210, 1220, 1230, and 1240 are interconnected using a system bus 1250. The processor 1210 is capable of processing instructions for execution within the system 1200. In one implementation, the processor 1210 is a single-threaded processor.

In another implementation, the processor 1210 is a multi-threaded processor. The processor 1210 is capable of processing instructions stored in the memory 1220 or on the storage device 1230 to display graphical information for a user interface on the input/output device 1240.

The memory 1220 stores information within the system 1200. In one implementation, the memory 1220 is a computer-readable medium. In one implementation, the memory 1220 is a volatile memory unit. In another implementation, the memory 1220 is a non-volatile memory unit.

The storage device 1230 is capable of providing mass storage for the system 1200. In one implementation, the storage device 1230 is a computer-readable medium. In various different implementations, the storage device 1230 may be a floppy disk device, a hard disk device, an optical disk device, or a tape device.

The input/output device 1240 provides input/output operations for the system 1200. In one implementation, the input/output device 1240 includes a keyboard and/or pointing device. In another implementation, the input/output device 1240 includes a display unit for displaying graphical user interfaces.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
    receiving, for an organization that is associated with a particular industry, first, information technology (IT) domain activity data from a first, IT network domain and second, operational technology (OT) domain activity data from a second, OT network domain, the first IT domain activity data and the second OT domain activity data including events, alerts, or both from the respective first and second network domains;
    determining, based on the first IT domain activity data and the second OT domain activity data, one or more anomalous correlated event paths through which security events have progressed through at least one of the first IT network domain or the second OT network domain, each anomalous correlated event path including one or more assets of the organization;
    generating one or more first data constructs that has a particular data structure and that include (i) the first IT domain activity data, (ii) the second OT domain activity data, and (iii) data describing the one or more anomalous correlated event paths;
    receiving, from an external threat feed to which the organization subscribes to receive threat data that is specific to the particular industry, the external threat data including events, alerts, or both for one or more other organizations that are different from the organization and that are also associated with the particular industry;
    generating a second data construct that also has the particular data structure and that includes data from the one or more first data constructs and at least a portion of the external threat data that was received through the feed;
    determining, based on the one or more anomalous correlated event paths and the external threat data, a risk associated with each of one or more outcomes for the organization;
    generating a visualization of the one or more anomalous correlated event paths and each risk;
    generating a third data construct that also has the particular data structure and that specifies a course of action determined based on at least one of one or more anomalous correlated event paths and each risk; and
    providing the third data construct to a course of action module that implements the course of action.

2. The method of claim 1, wherein the visualization presents a number of security events for at least one of the first IT network domain or the second OT network domain for a particular period of time.

3. The method of claim 1, wherein the visualization presents a number of security events for each of the one or more assets for a particular period of time.

4. The method of claim 1, wherein the visualization presents an amount of security events that have taken each of the one or more attack paths.

5. The method of claim 1, wherein the visualization includes a Sankey diagram that illustrates a plurality of paths between particular threats and the one or more outcomes.

6. The method of claim 5, wherein the path between each particular threat and the one or more outcomes includes at least one asset and at least one business process of the organization.

7. The method of claim 5, wherein each path includes a link between a particular threat and a particular asset, and wherein a width of the link is based on a likelihood of the particular threat affecting the particular asset.

8. A system, comprising:
    one or more processors; and
    a computer-readable storage device coupled to the one or more processors and having instructions stored thereon which, when executed by the one or more processors, cause the one or more processors to perform operations comprising:

receiving, for an organization that is associated with a particular industry, first, information technology (IT) domain activity data from a first, IT network domain and second, operational technology (OT) domain activity data from a second, OT network domain, the first IT domain activity data and the second OT domain activity data including events, alerts, or both from the respective first and second network domains;

determining, based on the first IT domain activity data and the second OT domain activity data, one or more anomalous correlated event paths through which security events have progressed through at least one of the first IT network domain or the second OT network domain, each anomalous correlated event path including one or more assets of the organization;

generating one or more first data constructs that has a particular data structure and that include (i) the first IT domain activity data, (ii) the second OT domain activity data, and (iii) data describing the one or more anomalous correlated event paths;

receiving, from an external threat feed to which the organization subscribes to receive threat data that is specific to the particular industry, the external threat data including events, alerts, or both for one or more other organizations that are different from the organization and that are also associated with the particular industry;

generating a second data construct that also has the particular data structure and that includes data from the one or more first data constructs and at least a portion of the external threat data that was received through the feed;

determining, based on the one or more anomalous correlated event paths and the external threat data, a risk associated with each of one or more outcomes for the organization;

generating a visualization of the one or more anomalous correlated event paths and each risk;

generating a third data construct that also has the particular data structure and that specifies a course of action determined based on at least one of one or more anomalous correlated event paths and each risk; and providing the third data construct to a course of action module that implements the course of action.

9. The system of claim 8, wherein the visualization presents a number of security events for at least one of the first IT network domain or the second network OT domain for a particular period of time.

10. The system of claim 8, wherein the visualization presents a number of security events for each of the one or more assets for a particular period of time.

11. The system of claim 8, wherein the visualization presents an amount of security events that have taken each of the one or more attack paths.

12. The system of claim 8, wherein the visualization includes a Sankey diagram that illustrates a plurality of paths between particular threats and the one or more outcomes.

13. The system of claim 12, wherein the path between each particular threat and the one or more outcomes includes at least one asset and at least one business process of the organization.

14. The system of claim 12, wherein each path includes a link between a particular threat and a particular asset, and wherein a width of the link is based on a likelihood of the particular threat affecting the particular asset.

15. A non-transitory computer-readable storage medium coupled to one or more processors and having instructions stored thereon which, when executed by the one or more processors, cause the one or more processors to perform operations comprising:

receiving, for an organization that is associated with a particular industry, first, information technology (IT) domain activity data from a first, IT network domain and second, operational technology (OT) domain activity data from a second, OT network domain, the first IT domain activity data and the second OT domain activity data including events, alerts, or both from the respective first and second network domains;

determining, based on the first IT domain activity data and the second OT domain activity data, one or more anomalous correlated event paths through which security events have progressed through at least one of the first IT network domain or the second OT network domain, each anomalous correlated event path including one or more assets of the organization;

generating one or more first data constructs that has a particular data structure and that include (i) the first IT domain activity data, (ii) the second OT domain activity data, and (iii) data describing the one or more anomalous correlated event paths;

receiving, from an external threat feed to which the organization subscribes to receive threat data that is specific to the particular industry, the external threat data including events, alerts, or both for one or more other organizations that are different from the organization and that are also associated with the particular industry;

generating a second data construct that also has the particular data structure and that includes data from the one or more first data constructs and at least a portion of the external threat data that was received through the feed;

determining, based on the one or more anomalous correlated event paths and the external threat data, a risk associated with each of one or more outcomes for the organization;

generating a visualization of the one or more anomalous correlated event paths and each risk;

generating a third data construct that also has the particular data structure and that specifies a course of action determined based on at least one of one or more anomalous correlated event paths and each risk; and providing the third data construct to a course of action module that implements the course of action.

16. The non-transitory computer-readable storage medium of claim 15, wherein the visualization presents a number of security events for at least one of the first IT network domain or the second OT network domain for a particular period of time.

17. The non-transitory computer-readable storage medium of claim 15, wherein the visualization presents a number of security events for each of the one or more assets for a particular period of time.

18. The non-transitory computer-readable storage medium of claim 15, wherein the visualization presents an amount of security events that have taken each of the one or more attack paths.

19. The non-transitory computer-readable storage medium of claim 15, wherein the visualization includes a Sankey diagram that illustrates a plurality of paths between particular threats and the one or more outcomes.

20. The non-transitory computer-readable storage medium of claim 19, wherein the path between each particular threat and the one or more outcomes includes at least one asset and at least one business process of the organization.

21. The non-transitory computer-readable storage medium of claim 19, wherein each path includes a link between a particular threat and a particular asset, and wherein a width of the link is based on a likelihood of the particular threat affecting the particular asset.

* * * * *

UNITED STATES PATENT AND TRADEMARK OFFICE
CERTIFICATE OF CORRECTION

PATENT NO. : 10,944,772 B2
APPLICATION NO. : 16/191844
DATED : March 9, 2021
INVENTOR(S) : Shaan Mulchandani et al.

Page 1 of 1

It is certified that error appears in the above-identified patent and that said Letters Patent is hereby corrected as shown below:

In the Claims

In Claim 9, Column 27, Line 51, delete "network OT" and insert -- OT network --, therefor.

Signed and Sealed this
Sixteenth Day of November, 2021

Drew Hirshfeld
*Performing the Functions and Duties of the
Under Secretary of Commerce for Intellectual Property and
Director of the United States Patent and Trademark Office*